United States Patent [19]

Scheibli

[11] Patent Number: 5,073,631
[45] Date of Patent: Dec. 17, 1991

[54] REACTIVE DISAZO DYES WHICH CONTAIN TWO AMINOFLUORO-1,3,5-TRIAZINYL RADICALS

[75] Inventor: Peter Scheibli, Bottmingen, Switzerland

[73] Assignee: Ciba-Geigy Corporation, Ardsley, N.Y.

[21] Appl. No.: 246,031

[22] Filed: Sep. 14, 1988

Related U.S. Application Data

[63] Continuation of Ser. No. 12,326, Feb. 9, 1987, abandoned, which is a continuation of Ser. No. 867,588, May 27, 1986, abandoned, which is a continuation of Ser. No. 583,423, Feb. 24, 1984, abandoned.

[30] Foreign Application Priority Data

Feb. 24, 1983 [CH] Switzerland .................. 1032/83

[51] Int. Cl.$^5$ .................. C09B 62/09; D06P 1/382
[52] U.S. Cl. .................. 534/634; 534/638
[58] Field of Search .................. 534/632, 633, 634, 635, 534/636, 622, 623, 628, 629, 637, 638, 641, 642

[56] References Cited

U.S. PATENT DOCUMENTS

| | | | |
|---|---|---|---|
| 3,966,705 | 6/1976 | Oesterlein et al. | 534/634 X |
| 4,066,389 | 1/1978 | Riat et al. | 534/634 X |
| 4,228,071 | 10/1980 | Riat et al. | 534/634 |

FOREIGN PATENT DOCUMENTS

| | | | |
|---|---|---|---|
| 0040460 | 11/1981 | European Pat. Off. | 534/634 |
| 0043796 | 1/1982 | European Pat. Off. | 534/634 |
| 0065732 | 12/1982 | European Pat. Off. | 534/634 |
| 2738823 | 3/1978 | Fed. Rep. of Germany | 534/634 |
| 53-117024 | 10/1978 | Japan | 534/634 |
| 1387925 | 3/1975 | United Kingdom | 534/634 |
| 1515030 | 6/1978 | United Kingdom | 534/637 |
| 1542773 | 3/1979 | United Kingdom | 534/634 |
| 2023161A | 12/1979 | United Kingdom | 534/634 |
| 1583387 | 1/1981 | United Kingdom | 534/634 |

Primary Examiner—Mary C. Lee
Assistant Examiner—Fiona T. Powers
Attorney, Agent, or Firm—Wenderoth, Lind & Ponack

[57] ABSTRACT

Reactive dyes of the formula

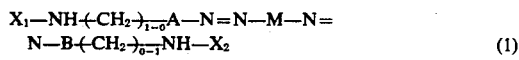

(1)

in which M is twice-coupled 1-amino-8-hydroxynaphthalene-3,6-disulfonic acid, 1-amino-8-hydroxynaphthalene-4,6-disulfonic acid, 1-amino-8-hydroxynaphthalene-4-sulfonic acid or 2-amino-5-hydroxynaphthalene-7-sulfonic acid, A and B, independently of each other, are each unsubstituted or substituted phenylene or naphthylene, and $X_1$ and $X_2$, independently of each other, are each unsubstituted or substituted aminofluoro-1,3,5-triazinyl, excluding the reactive dyes of German Offenlegungsschrift 2,738,823, are suitable in particular for dyeing and printing cellulose-containing fibre materials and produce, combined with a high dyeing yield, dyeings and prints having good fastness properties.

2 Claims, No Drawings

REACTIVE DISAZO DYES WHICH CONTAIN TWO AMINOFLUORO-1,3,5-TRIAZINYL RADICALS

This application is a continuation of now abandoned application Ser. No. 012,326, filed Feb. 9, 1987, which application is a continuation of now abandoned application Ser. No. 867,588, filed May 27, 1986, which application is, in turn, a continuation of now abandoned application Ser. No. 583,423, filed Feb. 24, 1984.

The present invention relates to novel reactive dyes, to a process for their preparation, and to their use for dyeing or printing fibre materials.

The practice of dyeing with reactive dyes has, in recent years, led to increased demands on the quality of the dyeings and the economics of the dyeing process. There consequently continues to be a demand for new reactive dyes which have improved properties in general and in particular in respect of the application.

It is the object of the present invention to provide new, improved reactive dyes which dye cotton in blue and navy shades. The new dyes shall be distinguished in particular by high degrees of fixation and high fibre-dye bond stabilities, they should be suitable in particular for dyeing by the exhaust method and the cold pad-batch method and also for printing, and the portions of the dye not fixed to the fibre shall be easily washed off.

Furthermore, the dyeings and prints which can be obtained with the new dyes shall have good general fastness properties, for example lightfastness and wetfastness properties.

It was found that the novel bireactive dyes defined below, which contain two terminal aminofluoro-1,3,5-triazinyl radicals, meet the stated requirements.

The invention accordingly provides reactive dyes of the formula

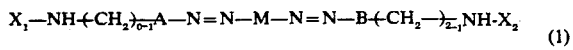

$$X_1-NH+CH_2)_{\overline{0-7}}A-N=N-M-N=N-B+CH_2)_{\overline{0-7}}NH-X_2 \quad (1)$$

in which M is twice-coupled 1-amino-8-hydroxynaphthalene-3,6-disulfonic acid, 1-amino-8-hydroxynaphthalene-4,6-disulfonic acid, 1-amino-8-hydroxynaphthalene-4-sulfonic acid or 2-amino-5-hydroxynaphthalene-7-sulfonic acid, A and B, independently of each other, are each unsubstituted or substituted phenylene or naphthylene, and $X_1$ and $X_2$, independently of each other, are each unsubstituted or substituted aminofluoro-1,3,5-triazinyl, excluding the reactive dyes of German Offenlegungsschrift 2,738,823.

The radicals A and B in the formula (1) can be further substituted, for example by alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, alkanoylamino groups having 1 to 4 carbon atoms, such as acetylamino or propionylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, ureido, hydroxyl, carboxyl, sulfomethyl or sulfo. Preferred substituents are methyl, ethyl, methoxy, ethoxy, acetylamino, chlorine, bromine, ureido, hydroxyl, carboxyl, sulfomethyl and in particular sulfo.

The unsubstituted or substituted amino groups in the fluoro-1,3,5-triazinyl radicals $X_1$ and $X_2$ can be $-NH_2$, alkylamino, N,N-dialkylamino, cycloalkylamino, N,N-dicycloalkylamino, aralkylamino or arylamino groups, mixed-substituted amino groups, such as N-alkyl-N-cyclohexylamino and N-alkyl-N-arylamino groups, amino groups which contain heterocyclic radicals onto which further, carbocyclic rings can be fused, and amino groups wherein the amino-nitrogen atom is part of an N-heterocyclic ring which can, if desired, also contain further heteroatoms. The abovementioned alkyl radicals can be straight-chain or branched, and of low or high molecular weight, and they are preferably alkyl radicals having 1 to 6 carbon atoms; suitable cycloalkyl, aralkyl and aryl radicals are in particular cyclohexyl, benzyl, phenethyl, phenyl and naphthyl radicals; heterocyclic radicals are especially furan, thiophene, pyrazole, pyridine, pyrimidine, quinoline, benzimidazole, benzothiazole and benzoxazole radicals; and amino groups wherein the amino-nitrogen atom is part of an N-heterocyclic ring can preferably be radicals of six-membered N-heterocyclic compounds which can contain nitrogen, oxygen or sulfur as further heteroatoms. The abovementioned alkyl, cycloalkyl, aralkyl and aryl radicals, the heterocyclic radicals and the N-heterocyclic rings can be further substituted, for example by halogen, such as fluorine, chlorine and bromine, nitro, cyano, trifluoromethyl, sulfamoyl, carbamoyl, $C_{1-4}$-alkyl, $C_{1-4}$-alkoxy, acylamino groups, such as acetylamino or benzoylamino, ureido, hydroxyl, carboxyl, sulfomethyl or sulfo. Examples of such amino groups are $-NH_2$, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, N-methyl-N-phenylamino, N-ethyl-N-phenylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, phenylamino, toluidino, xylidino, chloroanilino, anisidino, phenetidino, N-methyl-N-phenylamino, N-ethyl-N-phenylamino, N-β-hydroxyethyl-N-phenylamino, 2-, 3- or 4-sulfoanilino, 2,5-disulfoanilino, 4-sulfomethylanilino, N-sulfomethylanilino, 2-, 3- or 4-carboxyphenylamino, 2-carboxy-5-sulfophenylamino, 2-carboxy-4-sulfophenylamino, 4-sulfonaphth-1-ylamino, 3,6-disulfonaphth-1-ylamino, 3,6,8-trisulfonaphth-1-ylamino, 4,6,8-trisulfonaphth-1-ylamino, 1-sulfonaphth-2-ylamino, 1,5-disulfonaphth-2-ylamino, 6-sulfonaphth-2-ylamino, morpholino, piperidino and piperazino.

Preference is given to: reactive dyes of the formula

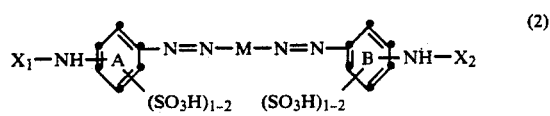

$$X_1-NH-\underset{(SO_3H)_{1-2}}{\boxed{A}}-N=N-M-N=N-\underset{(SO_3H)_{1-2}}{\boxed{B}}-NH-X_2 \quad (2)$$

in which M, $X_1$ and $X_2$ are as defined under the formula (1), and the benzene rings A and B can be further substituted independently of each other; reactive dyes of the formula (2) in which $X_1$ and $X_2$, independently of each other, are each a radical of the formula (3)

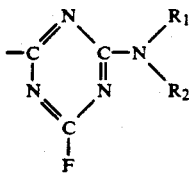

in which $R_1$ and $R_2$, independently of each other, are each hydrogen, $C_{1-4}$-alkyl which is unsubstituted or substituted by halogen, cyano, $C_{1-4}$-alkoxy, hydroxyl, carboxyl, sulfo or sulfato, benzyl, phenethyl, cyclohexyl, phenyl which is unsubstituted or substituted by halogen, nitro, cyano, trifluoromethyl, sulfamoyl, carbamoyl, $C_{1-4}$-alkyl, $C_{1-4}$-alkoxy, $C_{1-4}$-alkanoylamino, benzoylamino, ureido, hydroxyl, carboxyl, sulfomethyl or sulfo, or naphthyl which is unsubstituted or substituted by halogen, nitro, $C_{1-4}$-alkoxy, $C_{1-4}$-alkanoylamino, hydroxyl, carboxyl or sulfo, or in which $R_1$ and $R_2$ are, together with the amino-nitrogen atom, a morpholino, piperidino or piperazino radical; reactive dyes of the formula (2) in which the benzene rings A and B are not further substituted;

reactive dyes of the formula

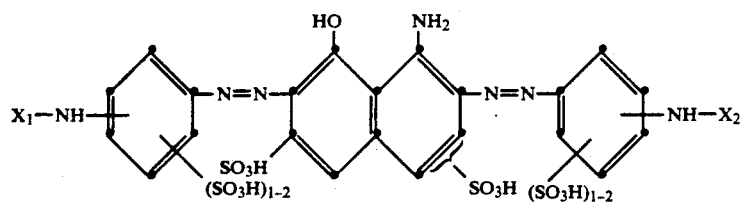

(4)

in which $X_1$ and $X_2$ are as defined for the formula (2);
reactive dyes of the formula

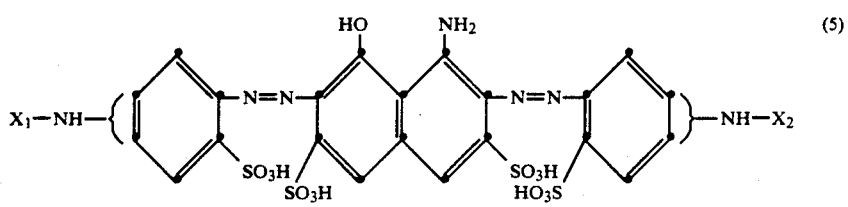

(5)

in which $X_1$ and $X_2$ are as defined for the formula (2), but the reactive dyes of German Offenlegungsschrift 2,738,823 are excluded;

reactive dyes of the formula

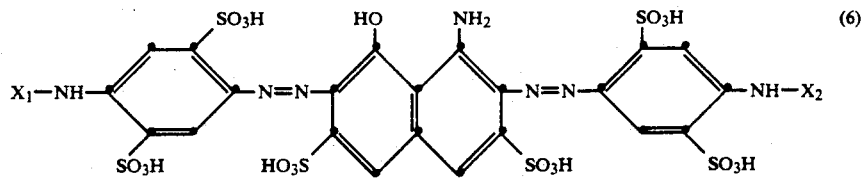

(6)

in which $X_1$ and $X_2$ are as defined for the formula (2); reactive dyes of the formula

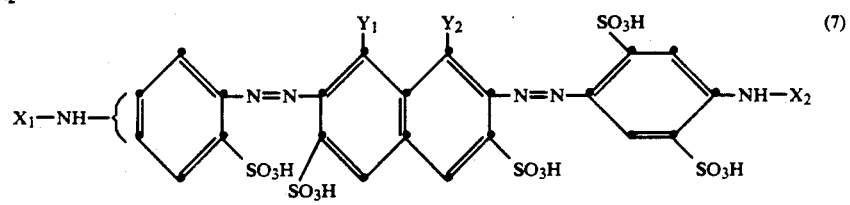

(7)

in which one Y is OH and the other Y is $NH_2$, and $X_1$ and $X_2$ are as defined for the formula (2); and reactive dyes of the formula (5), (6) or (7) in which $X_1$ and $X_2$, independently of each other, are each a radical of the formula (3) in which the $-NR_1R_2$ amino group is $-NH_2$, N-$\beta$-hydroxyethylamino, N,N-$\beta$-di-$\beta$-hydroxyethylamino, $\beta$-sulfoethylamino, phenylamino which is unsubstituted in the phenyl nucleus or is substituted there by chlorine, methyl, ethyl, methoxy, ethoxy, acetylamino, hydroxyl, carboxyl, sulfomethyl or sulfo, N-$C_{1-4}$-alkyl-N-phenylamino which is unsubstituted in the phenyl nucleus or substituted thereby chlorine, methyl or ethyl, N-sulfo-$C_{1-4}$-alkyl-N-phenylamino which is unsubstituted in the phenyl nucleus or is substituted there by chlorine, methyl or ethyl, N-hydroxy-$C_{1-4}$-alkyl-N-phenylamino, or sulfonaphthylamino.

The process for preparing reactive dyes of the formula (1) comprises reacting diazo components of the formulae

(8)

and

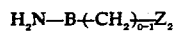 (9)

in which $Z_1$ and $Z_2$, independently of each other, are each $NH_2$, acethylamin or nitro, the coupling component 1-amino-8-hydroxynaphthalene-3,6-disulfonic acid, 1-amino-8-hydroxynaphthalene-4,6-disulfonic acid, 1-amino-8-hydroxynaphthalene-4-sufonic acid or 2-amino-5-hydroxybnaphthalene-7-sulfonic acid, 2 equivalents of 2,4,6-trifluoro-1,3,5-triazine and 2 equivalents of identical or different amines by diazotisation, coupling and condensation in suitable order to give reactive dyes of the formula (1), provided that if $Z_1$ or $Z_2$ is acetylamino or nitro it is converted into the $NH_2$ group, by hydrolysing the acetylamino group and reducing the nitro group, before the condensation with the fluorotriazine.

Since the individual process steps given above can be carried out in different orders and in some cases, where appropriate, even synchronously, various versions of this process are possible. The starting materials for each step of the overall reaction follow from the formula (1). In general, the reaction is carried out in successive steps, the order in which the simple reactions between the individual components of the reaction being subject to certain restrictions. On the one hand, the coupling in acid solution, and in ortho-position relative to the $NH_2$ group, onto the middle component M must be carried out first, since after a preceding coupling in neutral alkaline solution, in ortho-position relative to the OH group, a subsequent coupling ortho to amino is no longer possible. Since, furthermore, a fluorotriazine radical is hydrolysed under certain conditions, an intermediate which contains acetylamino groups (see below) must be hydrolysed, to split off the acetyl groups, before condensation with an aminodifluorotriazine or trifluorotriazine.

In important versions of the process, 1. an $HNR_1R_2$ amine, 2,4,6-trifluoro-1,3,5-triazine and a diaminobenzenesulfonic acid are condensed, the resulting secondary condensation product is diazotised and is coupled under acid conditions onto 1-amino-8-hydroxynaphthalene-3,6-disulfonic acid, a further amine is condensed with 2,4,6-trifluoro-1,3,5-triazine and a diaminobenzenesulfonic acid, the secondary condensation product is diazotised and the resulting second diazonium compound is coupled in neutral or alkaline solution onto the monoazo compound prepared first;

2. 2 moles of an aminoacetylaminobenzenesulfonic acid or two different aminoacetylaminobenzenesulfonic acids are coupled under acid and alkaline conditions onto 1-amino-8-hydroxynaphthalene-3,6-disulfonic acid, the resulting disazo dye is hydrolysed, the resulting diaminodisazo dye is condensed with 2 equivalents of 2,4,6-trifluoro-1,3,5-triazine, and the product is finally reacted with 2 equivalents of an $HNR_1R_2$ amine, or the condensation is done with 2 equivalents of an aminodifluorotriazine. In place of an aminoacetylaminobenzenesulfonic acid it is also possible to use an aminonitrobenzenesulfonic acid or two different aminonitrobenzenesulfonic acids as the diazo components, to convert the nitro groups in the resulting dinitrodisazo dye by reduction, for example with iron using the BÉCHAMPS method, into amino groups, and to use the resulting diaminodisazo dyestuff further as described above;

3. an aminoacetylaminobenzenesulfonic acid is diazotised and coupled under acid conditions onto 1-amino-8-hydroxynaphthalene-3,6-disulfonic acid, and the acetyl group is eliminated from the resulting o-aminoazo compound by hydrolysis, an $HNR_1R_2$ amine, 2,4,6-trifluoro-1,3,5-triazine and a diaminobenzenesulfonic acid are condensed with one another, the secondary condensation product is diazotised and coupled onto the monoazo compound prepared first, the free, acylatable amino group in the radical of the first diazo component is then condensed with trifluorotriazine, and the product is in the end condensed with 1 equivalent of an $HNR_1R_2$ amine, or the condensation is done with 1 equivalent of an aminodifluorotriazine. The two $HNR_1R_2$ amines which are used in fluorotriazi succession can be identical or different. In this version of the process too, it is possible to use an aminonitrobenzenesulfonic acid as the diazo component in place of the aminoacetylaminobenzenesulfonic acid, to reduce the nitro-o-aminoazo compound, and then to couple further as above.

Which reaction is advantageously carried out first in preparing a secondary condensation product from an $HNR_1R_2$ amine, 2,4,6-trifluoro-1,3,5-triazine and diaminobenzenesulfonic acid, that of the trifluorotriazine with the amine or that with the diaminobenzenesulfonic acid, varies from case to case and mainly depends on the solubility of the amino compounds in question and on the basicity of the amino groups to be acylated.

In the above explanation of the most important versions of the process, the coupling component which can be coupled twice was always given as 1-amino-8-hydroxynaphthalene-3,6-disulfonic acid and the acylatable diazo component was always given as a diaminobenzenesulfonic acid or an aminoacetylaminobenzenesulfonic acid. In place of these it is of course also possible to use other components which meet the definition for the M, A and B radicals in the formula (1), for example 1-amino-8-hydroxynaphthalene-4,6-disulfonic acid as coupling component, and differently substituted diaminobenzenes, such as 1,4-diaminobenzene or 1,3-diamino-4-chlorobenzene, or diaminonaphthalenes, such as 2,6-diaminonaphthalene, as diazo components.

There now follow specific examples of possible starting materials which can be used for preparing the reactive dyes of the formula (1).

Diazo components of the formulae (8) and (9)

1,3-Diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenylene), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobebenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diaminodiphenylurea-2,2'-disulfonic acid, 4,4'-diaminodiphenyloxyethane- 2,2'-disulfonic acid, 4,4'-diaminostilbene-2,2'-disulfonic acid and 4,4'-diaminodiphenylethane-2,2'-disulfonic acid.

If the diazo component used is to be not a diamine but an aminoacetylamino compound from which the acetyl group is subsequently eliminated again by hydrolysis, as described above in the explanations of the versions of the process and as provided for in the formulae (8) and (9), suitable acetyl compounds are the monoacetyl compounds of the abovementioned diazo components, for example 1-acetylamino-3-aminobenzene-4-sulfonic acid or 1-acetylamino-4-aminobenzene-3-sulfonic acid.

According to the formula (1), the amino group which bonds the aminofluoro-1,3,5-triazinyl radical $X_1$ to the radical A can be bonded directly to A or via a —$CH_2$— group; the same applies to $X_2$ and B. In the case of a bond via —$CH_2$—, the diazo component used is a compound which, in addition to the amino group to be diazotised, contains an acylatable aminomethyl group, for example 2-amino-5-aminomethylnaphthalene-1-sulfonic acid, 2-amino-5-aminomethylnaphthalene-1,7-disulfonic acid or 1-amino-4-methoxy-5-aminomethylbenzene-6-sulfonic acid.

Coupling components

1-Amino-8-hydroxynaphthalene-3,6-disulfonic acid, 1-amino-8-hydroxynaphthalene-4,6-disulfonic acid, 1-amino-8-hydroxynaphthalene-4-sulfonic acid and 2-amino-5-hydroxynaphthalene-7-sulfonic acid.

Reactive components 2,4,6-Trifluoro-1,3,5-triazine (cyanuric fluoride) and the primary condensation products of 2,4,6-trifluoro-1,3,5-triazine with the amines mentioned below.

Amines

Ammonia, methylamine, dimethylamine, ethylamine, diethylamine, propylamine, isopropylamine, butylamine, dibutylamine, isobutylamine, sec.-butylamine, tert.-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, phenethylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- and 4-acetylaminoaniline, 2,5-dimethoxyaniline, o-, m- and p-anisidine, o-, m- and p-phenetidine, 2-methoxy-5-methylaniline, 2-ethoxy-5-methoxyaniline, 4-bromoaniline, 3-aminobenzamide, 4-aminophenylsulfamide, 3-trifluoromethylaniline, 3- and 4-aminophenylurea, 1-naphthylamine, 2-naphthylamine, orthanilic acid, metanilic acid, sulfanilic acid, aniline-2,4-disulfonic acid, aniline-2,5-disulfonic acid, aniline-3,5-disulfonic acid, anthranilic acid, m- and p-aminobenzoic acid, 4-aminophenylmethanesulfonic acid, aniline-N-methanesulfonic acid, 2-aminotoluene-4-sulfonic acid, 2-aminotoluene-5-sulfonic acid, p-aminosalicylic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8- and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8- and -4,6,8-trisulfonic acid, 2-naphthylamine-1,3,7-, -1,5,7-, -3,5,7-, -3,6,7-, -3,6,8- and -4,6,8-trisulfonic acid, 2-, 3- and 4-aminopyridine, 2-aminobenzothiazole, 5-, 6- and 8-aminoquinoline, 2-aminopyrimidine, morpholine, piperidine and piperazine.

The diazo components of the formulae (8) and (9) or the intermediates containing a diazotisable amino group are generally diazotised at a low temperature through the action of nitrous acid in an aqueous solution of a mineral acid. The first coupling of the coupling component M is effected at acid or strong acid pH, and the second coupling at weakly acid, neutral or weakly alkaline pH.

2,4,6-Trifluoro-1,3,5-triazine is preferably condensed with the diazo components of the formulae (8) and (9) and with the amines or with acylatable monoazo or disazo intermediates in aqueous solution or suspension at a low temperature and at a weakly acid, neutral or weakly alkaline pH. The hydrogen fluoride liberated in the course of the condensation is advantageously continuously neutralised by adding aqueous alkali metal hydroxides, carbonates or bicarbonates.

The disazo dyes of the formula (1) are fibre-(bi)-reactive, since they contain a detachable fluorine atom bonded to each of the two s-triazine rings.

Fibre-reactive compounds are to be understood as meaning those which are capable of reacting with the hydroxyl groups of cellulose or with the amino groups of natural or synthetic polyamides to form covalent chemical bonds.

The reactive dyes of the formula (1) are suitable for dyeing and printing a very wide variety of materials, such as silk, leather, wool, polyamide fibres and polyurethanes, and in particular cellulose-containing fibre materials of any type. Examples of these fibre materials are natural cellulose fibre, such as cotton, linen and hemp, as well as cellulose and regenerated cellulose. The reactive dyes of the formula (1) are also suitable for dyeing or printing hydroxyl-containing fibres which are present in blend fabrics, for example blends of cotton with polyester fibres or polyamide fibres.

The dyes according to the invention can be variously applied to the fibre material and fixed on the fibre, in particular in the form of aqueous dye solutions and print pastes. They are suitable not only for the exhaust method but also for dyeing by the pad-dyeing method, in which the goods are impregnated with aqueous salt-containing or salt-free dye solutions, and the dyes are fixed, if desired under heat, after an alkali treatment or in the presence of alkali. They are particularly suitable for the cold pad-batch method, in which the dye is applied on a pad-mangle, together with the alkali, and is then fixed by storing at room temperature for several hours. After the fixing, the dyeings or prints are thoroughly rinsed with cold and hot water in the absence or presence of an agent acting like a dispersant and promoting the diffusion of the unfixed portions.

The reactive dyes of the formula (1) are distinguished by high reactivity and good fixing properties. They can therefore be applied by the exhaust dyeing method at low dyeing temperatures and only require short steaming times in the pad-steam method. The degrees of fixation are high, and the unfixed portions are easily washed off.

The reactive dyes of the formula (1) are particularly suitable for dyeing cotton by the exhaust dyeing method, the difference between the degree of exhaustion and the degree of fixation being remarkably small, i.e. the hydrolysis loss being very small. The reactive dyes of the formula (1) are also particularly suitable for printing, especially on cotton, but also for printing nitrogen-containing fibres, for example wool, silk or wool-containing blend fabrics.

The dyeings and prints on cellulose fibre materials prepared with the dyes according to the invention have a high tinctorial strength and a high fibre-dye bond stability, not only in the acid but also in the alkaline range, and also a good lightfastness and very good wetfastness properties, such as washing, water, seawater, cross-dyeing and perspiration fastness properties, as well as a good fastness to pleating, hot-pressing and rubbing.

The following examples serve to illustrate the invention. The temperatures are given in degrees centigrade. The parts and percentages are by weight, unless stated otherwise. Parts by weight relate to parts by volume as the kilogram relates to the liter.

The preparation of the monoazo or disazo intermediate compounds has not been described in all cases in the following illustrative embodiments, but it is immediately apparent from the general description.

EXAMPLE 1

A mixture of 45.6 parts of diazotised 2-(3'-amino-4'-sulfophenylamino)-4-fluoro-6-(2''-sulfophenylamino)-1,3,5-triazine and 300 parts of water is added at 0° to 5° C. to 78.7 parts of the coupling component which is dissolved in 600 parts of water and has the formula

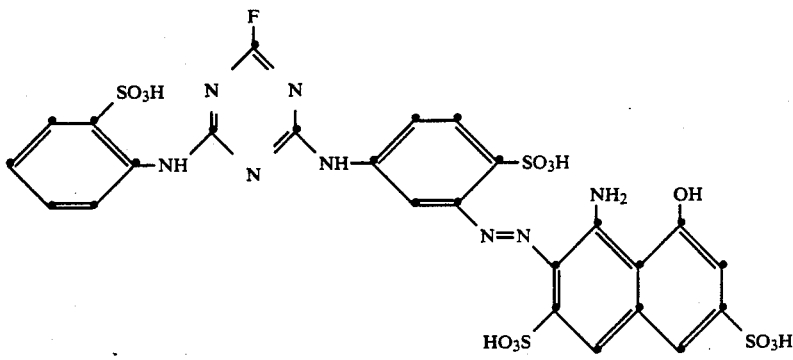

(prepared by acid coupling of diazotised 2-(3'-amino-4'-sulfophenylamino)-4-fluoro-6-(2''-sulfophenylamino)-1,3,5-triazine onto 1-amino-8-hydroxynaphthalene-3,6-disulfonic acid). After the coupling reaction, at pH 6.5-7.5, has ended, the resulting reactive dye of the formula

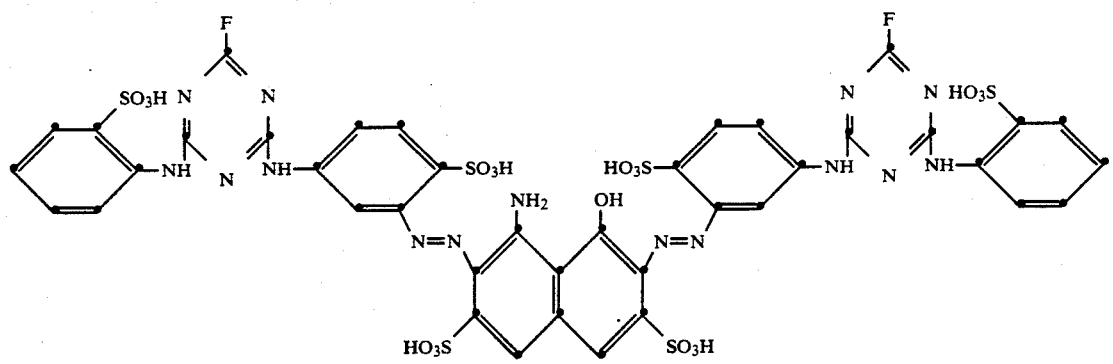

is isolated at pH 7 by evaporating or freeze-drying the reaction solution. It dyes cotton in blue shades.

Further valuable reactive dyes which dye cotton in the shades given in column 4 of Table 1 are obtained by coupling the diazotised diazo component given in column 2 under acid conditions in accordance with the instructions given in Example 1 onto 1-amino-8-hydroxynaphthalene-3,6-disulfonic acid, and coupling the diazotised diazo component given in column 3 onto the monoazo compound thus obtained.

TABLE 1

| No. | Diazo component | Diazo component | Shade on cotton |
|---|---|---|---|
| 1 | 2-(3'-Amino-4'-sulfophenylamino)-4-fluoro-6-(2''-sulfophenylamino)-1,3,5-triazine | 2-(3'-Amino-4'-sulfophenylamino)-4-fluoro-6-(1''-sulfonaphth-2''-ylamino)-1,3,5-triazine | blue |
| 2 | 2-(3'-Amino-4'-sulfophenylamino)-4-fluoro-6-(2''-sulfophenylamino)-1,3,5-triazine | 2-(3'-Amino-4'-sulfophenylamino)-4-fluoro-6-(2''-chloro-5''-sulfophenylamino)-1,3,5-triazine | blue |

TABLE 1-continued

| No. | Diazo component | Diazo component | Shade on cotton |
|---|---|---|---|
| 3 | 2-(3'-Amino-4'-sulfophenylamino)-4-fluoro-6-(2"-sulfophenylamino)-1,3,5-triazine | 2-(3'-Amino-4'-sulfophenylamino)-4-fluoro-6-($\beta$-hydroxyethylamino)-1,3,5-triazine | blue |
| 4 | 2-(3'-Amino-4'-sulfophenylamino)-4-fluoro-6-(2"-sulfophenylamino)-1,3,5-triazine | 2-(3'-Amino-4'-sulfophenylamino)-4-fluoro-6-($\beta$-sulfoethylamino)-1,3,5-triazine | blue |
| 5 | 2-(3'-Amino-4'-sulfophenylamino)-4-fluoro-6-(2"-sulfophenylamino)-1,3,5-triazine | 2-(4'-Amino-3'-sulfophenylamino)-4-fluoro-6-(2"-sulfophenylamino)-1,3,5-triazine | greenish blue |
| 6 | 2-(3'-Amino-4'-sulfophenylamino)-4-fluoro-6-(2"-sulfophenylamino)-1,3,5-triazine | 2-(4'-Amino-3'-sulfophenylamino)-4-fluoro-6-(1"-sulfonaphth-2"-ylamino)-1,3,5-triazine | greenish blue |
| 7 | 2-(3'-Amino-4'-sulfophenylamino)-4-fluoro-6-(2"-sulfophenylamino)-1,3,5-triazine | 2-(4'-Amino-3'-sulfophenylamino)-4-fluoro-6-(2"-chloro-5"-sulfophenylamino)-1,3,5-triazine | greenish blue |
| 8 | 2-(3'-Amino-4'-sulfophenylamino)-4-fluoro-6-(2"-sulfophenylamino)-1,3,5-triazine | 2-(4'-Amino-3'-sulfophenylamino)-4-fluoro-6-($\beta$-hydroxyethylamino)-1,3,5-triazine | greenish blue |
| 9 | 2-(3'-Amino-4'-sulfophenylamino)-4-fluoro-6-(2"-sulfophenylamino)-1,3,5-triazine | 2-(4'-Amino-3'-sulfophenylamino)-4-fluoro-6-($\beta$-sulfoethylamino)-1,3,5-triazine | greenish blue |
| 10 | 2-(3'-Amino-4'-sulfophenylamino)-4-fluoro-6-(2"-sulfophenylamino)-1,3,5-triazine | 2-(4'-Amino-2',5'-disulfophenylamino)-4-fluoro-6-(2"-sulfophenylamino)-1,3,5-triazine | greenish blue |
| 11 | 2-(3'-Amino-4'-sulfophenylamino)-4-fluoro-6-(2"-sulfophenylamino)-1,3,5-triazine | 2-(4'-Amino-2',5'-disulfophenylamino)-4-fluoro-6-(1"-sulfonaphth-2"-ylamino)-1,3,5-triazine | greenish blue |
| 12 | 2-(3'-Amino-4'-sulfophenylamino)-4-fluoro-6-(2"-sulfophenylamino)-1,3,5-triazine | 2-(4'-Amino-2',5'-disulfophenylamino)-4-fluoro-6-(2"-chloro-5"-sulfophenylamino)-1,3,5-triazine | greenish blue |
| 13 | 2-(3'-Amino-4'-sulfophenylamino)-4-fluoro-6-(2"-sulfophenylamino)-1,3,5-triazine | 2-(4'-Amino-2',5'-disulfophenylamino)-4-fluoro-6-($\beta$-hydroxyethylamino)-1,3,5-triazine | greenish blue |
| 14 | 2-(3'-Amino-4'-sulfophenylamino)-4-fluoro-6-(2"-sulfophenylamino)-1,3,5-triazine | 2-(4'-Amino-2',5'-disulfophenylamino)-4-fluoro-6-($\beta$-sulfoethylamino)-1,3,5-triazine | greenish blue |
| 15 | 2-(3'-Amino-4'-sulfophenylamino)-4-fluoro-6-(1"-sulfonaphth-2"-ylamino)-1,3,5-triazine | 2-(3'-Amino-4'-sulfophenylamino)-4-fluoro-6-(2"-sulfophenylamino)-1,3,5-triazine | blue |
| 16 | 2-(3'-Amino-4'-sulfophenylamino)-4-fluoro-6-(1"-sulfonaphth-2"-ylamino)-1,3,5-triazine | 2-(3'-Amino-4'-sulfophenylamino)-4-fluoro-6-(1"-sulfonaphth-2"-ylamino)-1,3,5-triazine | blue |
| 17 | 2-(3'-Amino-4'-sulfophenylamino)-4-fluoro-6-(1"-sulfonaphth-2"-ylamino)-1,3,5-triazine | 2-(3'-Amino-4'-sulfophenylamino)-4-fluoro-6-(2"-chloro-5"-sulfophenylamino)-1,3,5-triazine | blue |
| 18 | 2-(3'-Amino-4'-sulfophenylamino)-4-fluoro-6-(1"-sulfonaphth-2"-ylamino)-1,3,5-triazine | 2-(3'-Amino-4'-sulfophenylamino)-4-fluoro-6-($\beta$-hydroxyethylamino)-1,3,5-triazine | blue |
| 19 | 2-(3'-Amino-4'-sulfophenylamino)-4-fluoro-6-(1"-sulfonaphth-2"-ylamino)-1,3,5-triazine | 2-(3'-Amino-4'-sulfophenylamino)-4-fluoro-6-($\beta$-sulfoethylamino)-1,3,5-triazine | blue |
| 20 | 2-(3'-Amino-4'-sulfophenylamino)-4-fluoro-6-(1"-sulfonaphth-2"-ylamino)-1,3,5-triazine | 2-(4'-Amino-3'-sulfophenylamino)-4-fluoro-6-(2"-sulfophenylamino)-1,3,5-triazine | greenish blue |
| 21 | 2-(3'-Amino-4'-sulfophenylamino)-4-fluoro-6-(1"-sulfonaphth-2"-ylamino)-1,3,5-triazine | 2-(4'-Amino-3'-sulfophenylamino)-4-fluoro-6-(1"-sulfonaphth-2"-ylamino)-1,3,5-triazine | greenish blue |
| 22 | 2-(3'-Amino-4'-sulfophenylamino)-4-fluoro-6-(1"-sulfonaphth-2"-ylamino)-1,3,5-triazine | 2-(4'-Amino-3'-sulfophenylamino)-4-fluoro-6-(2"-chloro-5"-sulfophenylamino)-1,3,5-triazine | greenish blue |
| 23 | 2-(3'-Amino-4'-sulfophenylamino)-4-fluoro-6-(1"-sulfonaphth-2"-ylamino)-1,3,5-triazine | 2-(4'-Amino-3'-sulfophenylamino)-4-fluoro-6-($\beta$-hydroxyethylamino)-1,3,5-triazine | greenish blue |
| 24 | 2-(3'-Amino-4'-sulfophenylamino)-4-fluoro-6-(1"-sulfonaphth-2"-ylamino)-1,3,5-triazine | 2-(4'-Amino-3'-sulfophenylamino)-4-fluoro-6-($\beta$-sulfoethylamino)-1,3,5-triazine | greenish blue |
| 25 | 2-(3'-Amino-4'-sulfophenylamino)-4-fluoro-6-(1"-sulfonaphth-2"-ylamino)-1,3,5-triazine | 2-(4'-Amino-2',5'-disulfophenylamino)-4-fluoro-6-(2"-sulfophenylamino)-1,3,5-triazine | greenish blue |
| 26 | 2-(3'-Amino-4'-sulfophenylamino)-4-fluoro-6-(1"-sulfonaphth-2"-ylamino)-1,3,5-triazine | 2-(4'-Amino-2',5'-disulfophenylamino)-4-fluoro-6-(1"-sulfonaphth-2"-ylamino)-1,3,5-triazine | greenish blue |
| 27 | 2-(3'-Amino-4'-sulfophenylamino)-4-fluoro-6-(1"-sulfonaphth-2"-ylamino)-1,3,5-triazine | 2-(4'-Amino-2',5'-disulfophenylamino)-4-fluoro-6-(2"-chloro-5"-sulfophenylamino)-1,3,5-triazine | greenish blue |
| 28 | 2-(3'-Amino-4'-sulfophenylamino)-4-fluoro-6-(1"-sulfonaphth-2"-ylamino)-1,3,5-triazine | 2-(4'-Amino-2',5'-disulfophenylamino)-4-fluoro-6-($\beta$-hydroxyethylamino)-1,3,5-triazine | greenish blue |
| 29 | 2-(3'-Amino-4'-sulfophenylamino)-4-fluoro-6-(1"-sulfonaphth-2"-ylamino)-1,3,5-triazine | 2-(4'-Amino-2',5'-disulfophenylamino)-4-fluoro-6-($\beta$-sulfoethylamino)-1,3,5-triazine | greenish blue |

TABLE 1-continued

| No. | Diazo component | Diazo component | Shade on cotton |
|---|---|---|---|
| 30 | 2-(3'-Amino-4'-sulfophenylamino)-4-fluoro-6-(2''-chloro-5''-sulfophenylamino)-1,3,5-triazine | 2-(3'-Amino-4'-sulfophenylamino)-4-fluoro-6-(2''-sulfophenylamino)-1,3,5-triazine | blue |
| 31 | 2-(3'-Amino-4'-sulfophenylamino)-4-fluoro-6-(2''-chloro-5''-sulfophenylamino)-1,3,5-triazine | 2-(3'-Amino-4'-sulfophenylamino)-4-fluoro-6-(1''-sulfonaphth-2''-ylamino)-1,3,5-triazine | blue |
| 32 | 2-(3'-Amino-4'-sulfophenylamino)-4-fluoro-6-(2''-chloro-5''-sulfophenylamino)-1,3,5-triazine | 2-(3'-Amino-4'-sulfophenylamino)-4-fluoro-6-(2''-chloro-5''-sulfophenylamino)-1,3,5-triazine | blue |
| 33 | 2-(3'-Amino-4'-sulfophenylamino)-4-fluoro-6-(2''-chloro-5''-sulfophenylamino)-1,3,5-triazine | 2-(3'-Amino-4'-sulfophenylamino)-4-fluoro-6-($\beta$-hydroxyethylamino)-1,3,5-triazine | blue |
| 34 | 2-(3'-Amino-4'-sulfophenylamino)-4-fluoro-6-(2''-chloro-5''-sulfophenylamino)-1,3,5-triazine | 2-(3'-Amino-4'-sulfophenylamino)-4-fluoro-6-($\beta$-sulfoethylamino)-1,3,5-triazine | blue |
| 35 | 2-(3'-Amino-4'-sulfophenylamino)-4-fluoro-6-(2''-chloro-5''-sulfophenylamino)-1,3,5-triazine | 2-(4'-Amino-3'-sulfophenylamino)-4-fluoro-6-(2''-sulfophenylamino)-1,3,5-triazine | greenish blue |
| 36 | 2-(3'-Amino-4'-sulfophenylamino)-4-fluoro-6-(2''-chloro-5''-sulfophenylamino)-1,3,5-triazine | 2-(4'-Amino-3'-sulfophenylamino)-4-fluoro-6-(1''-sulfonaphth-2''-ylamino)-1,3,5-triazine | greenish blue |
| 37 | 2-(3'-Amino-4'-sulfophenylamino)-4-fluoro-6-(2''-chloro-5''-sulfophenylamino)-1,3,5-triazine | 2-(4'-Amino-3'-sulfophenylamino)-4-fluoro-6-(2''-chloro-5''-sulfophenylamino)-1,3,5-triazine | greenish blue |
| 38 | 2-(3'-Amino-4'-sulfophenylamino)-4-fluoro-6-(2''-chloro-5''-sulfophenylamino)-1,3,5-triazine | 2-(4'-Amino-3'-sulfophenylamino)-4-fluoro-6-($\beta$-hydroxyethylamino)-1,3,5-triazine | greenish blue |
| 39 | 2-(3'-Amino-4'-sulfophenylamino)-4-fluoro-6-(2''-chloro-5''-sulfophenylamino)-1,3,5-triazine | 2-(4'-Amino-3'-sulfophenylamino)-4-fluoro-6-($\beta$-sulfoethylamino)-1,3,5-triazine | greenish blue |
| 40 | 2-(3'-Amino-4'-sulfophenylamino)-4-fluoro-6-(2''-chloro-5''-sulfophenylamino)-1,3,5-triazine | 2-(4'-Amino-2',5'-disulfophenylamino)-4-fluoro-6-(2''-sulfophenylamino)-1,3,5-triazine | greenish blue |
| 41 | 2-(3'-Amino-4'-sulfophenylamino)-4-fluoro-6-(2''-chloro-5''-sulfophenylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 42 | 2-(3'-Amino-4'-sulfophenylamino)-4-fluoro-6-(2''-chloro-5''-sulfophenylamino)-1,3,5-triazine | 2-(4'-Amino-2',5'-disulfophenylamino)-4-fluoro-6-(2''-chloro-5''-sulfophenylamino)-1,3,5-triazine | greenish blue |
| 43 | 2-(3'-Amino-4'-sulfophenylamino)-4-fluoro-6-(2''-chloro-5''-sulfophenylamino)-1,3,5-triazine | 2-(4'-Amino-2',5'-disulfophenylamino)-4-fluoro-6-($\beta$-hydroxyethylamino)-1,3,5-triazine | greenish blue |
| 44 | 2-(3'-Amino-4'-sulfophenylamino)-4-fluoro-6-(2''-chloro-5''-sulfophenylamino)-1,3,5-triazine | 2-(4'-Amino-2',5'-disulfophenylamino)-4-fluoro-6-($\beta$-sulfoethylamino)-1,3,5-triazine | greenish blue |
| 45 | 2-(3'-Amino-4'-sulfophenylamino)-4-fluoro-6-($\beta$-hydroxyethylamino)-1,3,5-triazine | 2-(3'-Amino-4'-sulfophenylamino)-4-fluoro-6-(2''-sulfophenylamino)-1,3,5-triazine | blue |
| 46 | 2-(3'-Amino-4'-sulfophenylamino)-4-fluoro-6-($\beta$-hydroxyethylamino)-1,3,5-triazine | 2-(3'-Amino-4'-sulfophenylamino)-4-fluoro-6-(1''-sulfonaphth-2''-ylamino)-1,3,5-triazine | blue |
| 47 | 2-(3'-Amino-4'-sulfophenylamino)-4-fluoro-6-($\beta$-hydroxyethylamino)-1,3,5-triazine | 2-(3'-Amino-4'-sulfophenylamino)-4-fluoro-6-(2''-chloro-5''-sulfophenylamino)-1,3,5-triazine | blue |
| 48 | 2-(3'-Amino-4'-sulfophenylamino)-4-fluoro-6-($\beta$-hydroxyethylamino)-1,3,5-triazine | 2-(3'-Amino-4'-sulfophenylamino)-4-fluoro-6-($\beta$-hydroxyethylamino)-1,3,5-triazine | blue |
| 49 | 2-(3'-Amino-4'-sulfophenylamino)-4-fluoro-6-($\beta$-hydroxyethylamino)-1,3,5-triazine | 2-(3'-Amino-4'-sulfophenylamino)-4-fluoro-6-($\beta$-sulfoethylamino)-1,3,5-triazine | blue |
| 50 | 2-(3'-Amino-4'-sulfophenylamino)-4-fluoro-6-($\beta$-hydroxyethylamino)-1,3,5-triazine | 2-(4'-Amino-3'-sulfophenylamino)-4-fluoro-6-(2''-sulfophenylamino)-1,3,5-triazine | greenish blue |
| 51 | 2-(3'-Amino-4'-sulfophenylamino)-4-fluoro-6-($\beta$-hydroxyethylamino)-1,3,5-triazine | 2-(4'-Amino-3'-sulfophenylamino)-4-fluoro-6-(1''-sulfonaphth-2''-ylamino)-1,3,5-triazine | greenish blue |
| 52 | 2-(3'-Amino-4'-sulfophenylamino)-4-fluoro-6-($\beta$-hydroxyethylamino)-1,3,5-triazine | 2-(4'-Amino-3'-sulfophenylamino)-4-fluoro-6-(2''-chloro-5''-sulfophenylamino)-1,3,5-triazine | greenish blue |
| 53 | 2-(3'-Amino-4'-sulfophenylamino)-4-fluoro-6-($\beta$-hydroxyethylamino)-1,3,5-triazine | 2-(4'-Amino-3'-sulfophenylamino)-4-fluoro-6-($\beta$-hydroxyethylamino)-1,3,5-triazine | greenish blue |
| 54 | 2-(3'-Amino-4'-sulfophenylamino)-4-fluoro-6-($\beta$-hydroxyethylamino)-1,3,5-triazine | 2-(4'-Amino-3'-sulfophenylamino)-4-fluoro-6-($\beta$-sulfoethylamino)-1,3,5-triazine | greenish blue |
| 55 | 2-(3'-Amino-4'-sulfophenylamino)-4-fluoro-6-($\beta$-hydroxyethylamino)-1,3,5-triazine | 2-(4'-Amino-2',5'-disulfophenylamino)-4-fluoro-6-(2''-sulfophenylamino)-1,3,5-triazine | greenish blue |
| 56 | 2-(3'-Amino-4'-sulfophenylamino)-4-fluoro-6-($\beta$-hydroxyethylamino)-1,3,5-triazine | 2-(4'-Amino-2',5'-disulfophenylamino)-4-fluoro-6-(1''-sulfonaphth-2''-ylamino)-1,3,5-triazine | greenish blue |

TABLE 1-continued

| No. | Diazo component | Diazo component | Shade on cotton |
|---|---|---|---|
| 57 | 2-(3'-Amino-4'-sulfophenylamino)-4-fluoro-6-(β-hydroxyethylamino)-1,3,5-triazine | 2-(4'-Amino-2',5'-disulfophenylamino)-4-fluoro-6-(2''-chloro-5''-sulfophenylamino)-1,3,5-triazine | greenish blue |
| 58 | 2-(3'-Amino-4'-sulfophenylamino)-4-fluoro-6-(β-hydroxyethylamino)-1,3,5-triazine | 2-(4'-Amino-2',5'-disulfophenylamino)-4-fluoro-6-(β-hydroxyethylamino)-1,3,5-triazine | greenish blue |
| 59 | 2-(3'-Amino-4'-sulfophenylamino)-4-fluoro-6-(β-hydroxyethylamino)-1,3,5-triazine | 2-(4'-Amino-2',5'-disulfophenyl-amino)-4-fluoro-6-(β-sulfoethyl-amino)-1,3,5-triazine | greenish blue |
| 60 | 2-(3'-Amino-4'-sulfophenylamino)-4-fluoro-6-(β-sulfoethylamino)-1,3,5-triazine | 2-(3'-Amino-4'-sulfophenylamino)-4-fluoro-6-(2''-sulfophenylamino)-1,3,5-triazine | blue |
| 61 | 2-(3'-Amino-4'-sulfophenylamino)-4-fluoro-6-(β-sulfoethylamino)-1,3,5-triazine | 2-(3'-Amino-4'-sulfophenylamino)-4-fluoro-6-(1''-sulfonaphth-2''-yl-amino)-1,3,5-triazine | blue |
| 62 | 2-(3'-Amino-4'-sulfophenylamino)-4-fluoro-6-(β-sulfoethylamino)-1,3,5-triazine | 2-(3'-Amino-4'-sulfophenylamino)-4-fluoro-6-(2''-chloro-5''-sulfophenyl-amino)-1,3,5-triazine | blue |
| 63 | 2-(3'-Amino-4'-sulfophenylamino)-4-fluoro-6-(β-sulfoethylamino)-1,3,5-triazine | 2-(3'-Amino-4'-sulfophenylamino)-4-fluoro-6-(β-hydroxyethylamino)-1,3,5-triazine | blue |
| 64 | 2-(3'-Amino-4'-sulfophenylamino)-4-fluoro-6-(β-sulfoethylamino)-1,3,5-triazine | 2-(3'-Amino-4'-sulfophenylamino)-4-fluoro-6-(β-sulfoethylamino)-1,3,5-triazine | blue |
| 65 | 2-(3'-Amino-4'-sulfophenylamino)-4-fluoro-6-(β-sulfoethylamino)-1,3,5-triazine | 2-(4'-Amino-3'-sulfophenylamino)-4-fluoro-6-(2''-sulfophenylamino)-1,3,5-triazine | greenish blue |
| 66 | 2-(3'-Amino-4'-sulfophenylamino)-4-fluoro-6-(β-sulfoethylamino)-1,3,5-triazine | 2-(4'-Amino-3'-sulfophenylamino)-4-fluoro-6-(1''-sulfonaphth-2''-ylamino)-1,3,5-triazine | greenish blue |
| 67 | 2-(3'-Amino-4'-sulfophenylamino)-4-fluoro-6-(β-sulfoethylamino)-1,3,5-triazine | 2-(4'-Amino-3'-sulfophenylamino)-4-fluoro-6-(2''-chloro-5''-sulfophenyl-amino)-1,3,5-triazine | greenish blue |
| 68 | 2-(3'-Amino-4'-sulfophenylamino)-4-fluoro-6-(β-sulfoethylamino)-1,3,5-triazine | 2-(4'-Amino-3'-sulfophenylamino)-4-fluoro-6-(β-hydroxyethylamino)-1,3,5-triazine | greenish blue |
| 69 | 2-(3'-Amino-4'-sulfophenylamino)-4-fluoro-6-(β-sulfoethylamino)-1,3,5-triazine | 2-(4'-Amino-3'-sulfophenylamino)-4-fluoro-6-(β-sulfoethylamino)-1,3,5-triazine | greenish blue |
| 70 | 2-(3'-Amino-4'-sulfophenylamino)-4-fluoro-6-(β-sulfoethylamino)-1,3,5-triazine | 2-(4'-Amino-2',5'-disulfophenylamino)-4-fluoro-6-(2''-sulfophenylamino)-1,3,5-triazine | greenish blue |
| 71 | 2-(3'-Amino-4'-sulfophenylamino)-4-fluoro-6-(β-sulfoethylamino)-1,3,5-triazine | 2-(4'-Amino-2',5'-disulfophenylamino)-4-fluoro-6-(1''-sulfonaphth-2''-yl-amino)-1,3,5-triazine | greenish blue |
| 72 | 2-(3'-Amino-4'-sulfophenylamino)-4-fluoro-6-(β-sulfoethylamino)-1,3,5-triazine | 2-(4'-Amino-2',5'-disulfophenylamino)-4-fluoro-6-(2''-chloro-5''-sulfophenyl-amino)-1,3,5-triazine | greenish blue |
| 73 | 2-(3'-Amino-4'-sulfophenylamino)-4-fluoro-6-(β-sulfoethylamino)-1,3,5-triazine | 2-(4'-Amino-2',5'-disulfophenylamino)-4-fluoro-6-(β-hydroxyethylamino)-1,3,5-triazine | greenish blue |
| 74 | 2-(3'-Amino-4'-sulfophenylamino)-4-fluoro-6-(β-sulfoethylamino)-1,3,5-triazine | 2-(4'-Amino-2',5'-disulfophenyl-amino)-4-fluoro-6-(β-sulfoethylamino)-1,3,5-triazine | greenish blue |
| 75 | 2-(4'-Amino-3'-sulfophenylamino)-4-fluoro-6-(2''-sulfophenylamino)-1,3,5-triazine | 2-(3'-Amino-4'-sulfophenylamino)-4-fluoro-6-(2''-sulfophenylamino)-1,3,5-triazine | greenish blue |
| 76 | 2-(4'-Amino-3'-sulfophenylamino)-4-fluoro-6-(2''-sulfophenylamino)-1,3,5-triazine | 2-(3'-Amino-4'-sulfophenylamino)-4-fluoro-6-(1''-sulfonaphth-2''-ylamino)-1,3,5-triazine | greenish blue |
| 77 | 2-(4'-Amino-3'-sulfophenylamino)-4-fluoro-6-(2''-sulfophenylamino)-1,3,5-triazine | 2-(3'-Amino-4'-sulfophenylamino)-4-fluoro-6-(2''-chloro-5''-sulfophenyl-amino)-1,3,5-triazine | greenish blue |
| 78 | 2-(4'-Amino-3'-sulfophenylamino)-4-fluoro-6-(2''-sulfophenylamino)-1,3,5-triazine | 2-(3'-Amino-4'-sulfophenylamino)-4-fluoro-6-(β-hydroxyethylamino)-1,3,5-triazine | greenish blue |
| 79 | 2-(4'-Amino-3'-sulfophenylamino)-4-fluoro-6-(2''-sulfophenylamino)-1,3,5-triazine | 2-(3'-Amino-4'-sulfophenylamino)-4-fluoro-6-(β-sulfoethylamino)-1,3,5-triazine | greenish blue |
| 80 | 2-(4'-Amino-3'-sulfophenylamino)-4-fluoro-6-(2''-sulfophenylamino)-1,3,5-triazine | 2-(4'-Amino-2',5'-disulfophenyl-amino-4-fluoro-6-(2''-sulfophenyl-amino)-1,3,5-triazine | greenish blue |
| 81 | 2-(4'-Amino-3'-sulfophenylamino)-4-fluoro-6-(2''-sulfophenylamino)-1,3,5-triazine | 2-(4'-Amino-2',5'-disulfophenyl-amino-4-fluoro-6-(1''-sulfonaphth-2''-ylamino)-1,3,5-triazine | greenish blue |
| 82 | 2-(4'-Amino-3'-sulfophenylamino)-4-fluoro-6-(2''-sulfophenylamino)-1,3,5-triazine | 2-(4'-Amino-2',5'-disulfophenyl-amino)-4-fluoro-6-(2''-chloro-5''-sulfophenylamino)-1,3,5-triazine | greenish blue |
| 83 | 2-(4'-Amino-3'-sulfophenylamino)-4-fluoro-6-(2''-sulfophenylamino)-1,3,5-triazine | 2-(4'-Amino-2',5'-disulfophenyl-amino)-4-fluoro-6-(β-hydroxyethyl-amino)-1,3,5-triazine | greenish blue |

TABLE 1-continued

| No. | Diazo component | Diazo component | Shade on cotton |
|---|---|---|---|
| 84 | 2-(4'-Amino-3'-sulfophenylamino)-4-fluoro-6-(2"-sulfophenylamino)-1,3,5-triazine | 2-(4'-Amino-2',5'-disulfophenylamino-4-fluoro-6-(β-sulfoethylamino)-1,3,5-triazine | greenish blue |
| 85 | 2-(4'-Amino-3'-sulfophenylamino)-4-fluoro-6-(1"-sulfonaphth-2"-yl-amino)-1,3,5-triazine | 2-(3'-Amino-4'-sulfophenylamino)-4-fluoro-6-(2"-sulfophenylamino)-1,3,5-triazine | greenish blue |
| 86 | 2-(4'-Amino-3'-sulfophenylamino)-4-fluoro-6-(1"-sulfonaphth-2"-yl-amino)-1,3,5-triazine | 2-(3'-Amino-4'-sulfophenylamino)-4-fluoro-6-(1"-sulfonaphth-2"-yl-amino)-1,3,5-triazine | greenish blue |
| 87 | 2-(4'-Amino-3'-sulfophenylamino)-4-fluoro-6-(1"-sulfonaphth-2"-yl-amino)-1,3,5-triazine | 2-(3'-Amino-4'-sulfophenylamino)-4-fluoro-6-(2"-chloro-5"-sulfophenylamino)-1,3,5-triazine | greenish blue |
| 88 | 2-(4'-Amino-3'-sulfophenylamino)-4-fluoro-6-(1"-sulfonaphth-2"-yl-amino)-1,3,5-triazine | 2-(3'-Amino-4'-sulfophenylamino)-4-fluoro-6-(β-hydroxyethylamino)-1,3,5-triazine | greenish blue |
| 89 | 2-(4'-Amino-3'-sulfophenylamino)-4-fluoro-6-(1"-sulfonaphth-2"-yl-amino)-1,3,5-triazine | 2-(3'-Amino-4'-sulfophenylamino)-4-fluoro-6-(β-sulfoethylamino)-1,3,5-triazine | greenish blue |
| 90 | 2-(4'-Amino-3'-sulfophenylamino)-4-fluoro-6-(1"-sulfonaphth-2"-yl-amino)-1,3,5-triazine | 2-(4'-Amino-2',5'-disulfophenylamino)-4-fluoro-6-(2"-sulfophenylamino)-1,3,5-triazine | greenish blue |
| 91 | 2-(4'-Amino-3'-sulfophenylamino)-4-fluoro-6-(1"-sulfonaphth-2"-yl-amino)-1,3,5-triazine | 2-(4'-Amino-2',5'-disulfophenylamino)-4-fluoro-6-(1"-sulfonaphth-2"-yl-amino)-1,3,5-triazine | greenish blue |
| 92 | 2-(4'-Amino-3'-sulfophenylamino)-4-fluoro-6-(1"-sulfonaphth-2"-yl-amino)-1,3,5-triazine | 2-(4'-Amino-2',5'-disulfophenylamino-4-fluoro-6-(2"-chloro-5"-sulfophenylamino)-1,3,5-triazine | greenish blue |
| 93 | 2-(4'-Amino-3'-sulfophenylamino)-4-fluoro-6-(1"-sulfonaphth-2"-yl-amino)-1,3,5-triazine | 2-(4'-Amino-2',5'-disulfophenylamino)-4-fluoro-6-(β-hydroxyethylamino)-1,3,5-triazine | greenish blue |
| 94 | 2-(4'-Amino-3'-sulfophenylamino)-4-fluoro-6-(1"-sulfonaphth-2"-yl-amino)-1,3,5-triazine | 2-(4'-Amino-2',5'-disulfophenylamino)-4-fluoro-6-(β-sulfoethylamino)-1,3,5-triazine | greenish blue |
| 95 | 2-(4'-Amino-3'-sulfophenylamino)-4-fluoro-6-(2"-chloro-5"-sulfophenylamino)-1,3,5-triazine | 2-(3'-Amino-4'-sulfophenylamino)-4-fluoro-6-(2"-sulfophenylamino)-1,3,5-triazine | greenish blue |
| 96 | 2-(4'-Amino-3'-sulfophenylamino)-4-fluoro-6-(2"-chloro-5"-sulfophenylamino)-1,3,5-triazine | 2-(3'-Amino-4'-sulfophenylamino)-4-fluoro-6-(1"-sulfonaphth-2"-yl-amino)-1,3,5-triazine | greenish blue |
| 97 | 2-(4'-Amino-3'-sulfophenylamino)-4-fluoro-6-(2"-chloro-5"-sulfophenylamino)-1,3,5-triazine | 2-(3'-Amino-4'-sulfophenylamino)-4-fluoro-6-(2"-chloro-5"-sulfophenylamino)-1,3,5-triazine | greenish blue |
| 98 | 2-(4'-Amino-3'-sulfophenylamino)-4-fluoro-6-(2"-chloro-5"-sulfophenylamino)-1,3,5-triazine | 2-(3'-Amino-4'-sulfophenylamino)-4-fluoro-6-(β-hydroxyethylamino)-1,3,5-triazine | greenish blue |
| 99 | 2-(4'-Amino-3'-sulfophenylamino)-4-fluoro-6-(2"-chloro-5"-sulfophenylamino)-1,3,5-triazine | 2-(3'-Amino-4'-sulfophenylamino)-4-fluoro-6-(β-sulfoethylamino)-1,3,5-triazine | greenish blue |
| 100 | 2-(4'-Amino-3'-sulfophenylamino)-4-fluoro-6-(2"-chloro-5"-sulfophenylamino)-1,3,5-triazine | 2-(4'-Amino-2',5'-disulfophenylamino)-4-fluoro-6-(2"-sulfophenylamino)-1,3,5-triazine | greenish blue |
| 101 | 2-(4'-Amino-3'-sulfophenylamino)-4-fluoro-6-(2"-chloro-5"-sulfophenylamino)-1,3,5-triazine | 2-(4'-Amino-2',5'-disulfophenylamino)-4-fluoro-6-(1"-sulfonaphth-2"-ylamino)-1,3,5-triazine | greenish blue |
| 102 | 2-(4'-Amino-3'-sulfophenylamino)-4-fluoro-6-(2"-chloro-5"-sulfophenylamino)-1,3,5-triazine | 2-(4'-Amino-2',5'-disulfophenylamino)-4-fluoro-6-(2"-chloro-5"-sulfophenylamino)-1,3,5-triazine | greenish blue |
| 103 | 2-(4'-Amino-3'-sulfophenylamino)-4-fluoro-6-(2"-chloro-5"-sulfophenylamino)-1,3,5-triazine | 2-(4'-Amino-2',5'-disulfophenylamino)-4-fluoro-6-(β-hydroxyethylamino)-1,3,5-triazine | greenish blue |
| 104 | 2-(4'-Amino-3'-sulfophenylamino)-4-fluoro-6-(2"-chloro-5"-sulfophenylamino)-1,3,5-triazine | 2-(4'-Amino-2',5'-disulfophenylamino)-4-fluoro-6-(β-sulfoethylamino)-1,3,5-triazine | greenish blue |
| 105 | 2-(4'-Amino-3'-sulfophenylamino)-4-fluoro-6-(β-hydroxyethylamino)-1,3,5-triazine | 2-(3'-Amino-4'-sulfophenylamino)-4-fluoro-6-(2"-sulfophenylamino)-1,3,5-triazine | greenish blue |
| 106 | 2-(4'-Amino-3'-sulfophenylamino)-4-fluoro-6-(β-hydroxyethylamino)-1,3,5-triazine | 2-(3'-Amino-4'-sulfophenylamino)-4-fluoro-6-(1"-sulfonaphth-2"-yl-amino)-1,3,5-triazine | greenish blue |
| 107 | 2-(4'-Amino-3'-sulfophenylamino)-4-fluoro-6-(β-hydroxyethylamino)-1,3,5-triazine | 2-(3'-Amino-4'-sulfophenylamino)-4-fluoro-6-(2"-chloro-5"-sulfophenylamino)-1,3,5-triazine | greenish blue |
| 108 | 2-(4'-Amino-3'-sulfophenylamino)-4-fluoro-6-(β-hydroxyethylamino)-1,3,5-triazine | 2-(3'-Amino-4'-sulfophenylamino)-4-fluoro-6-(β-hydroxyethylamino)-1,3,5-triazine | greenish blue |
| 109 | 2-(4'-Amino-3'-sulfophenylamino)-4-fluoro-6-(β-hydroxyethylamino)-1,3,5-triazine | 2-(3'-Amino-4'-sulfophenylamino)-4-fluoro-6-(β-sulfoethylamino)-1,3,5-triazine | greenish blue |
| 110 | 2-(4'-Amino-3'-sulfophenylamino)-4-fluoro-6-(β-hydroxyethylamino)-1,3,5-triazine | 2-(4'-Amino-2',5'-disulfophenylamino)-4-fluoro-6-(2"-sulfophenylamino)-1,3,5-triazine | greenish blue |

TABLE 1-continued

| No. | Diazo component | Diazo component | Shade on cotton |
|---|---|---|---|
| 111 | 2-(4'-Amino-3'-sulfophenylamino)-4-fluoro-6-(β-hydroxyethylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 112 | 2-(4'-Amino-3'-sulfophenylamino)-4-fluoro-6-(β-hydroxyethylamino)-1,3,5-triazine | 2-(4'-Amino-2',5'-disulfophenylamino)-4-fluoro-6-(2''-chloro-5''-sulfophenylamino)-1,3,5-triazine | greenish blue |
| 113 | 2-(4'-Amino-3'-sulfophenylamino)-4-fluoro-6-(β-hydroxyethylamino)-1,3,5-triazine | 2-(4'-Amino-2',5'-disulfophenylamino)-4-fluoro-6-(β-hydroxyethylamino)-1,3,5-triazine | greenish blue |
| 114 | 2-(4'-Amino-3'-sulfophenylamino)-4-fluoro-6-(β-hydroxyethylamino)-1,3,5-triazine | 2-(4'-Amino-2',5'-disulfophenylamino)-4-fluoro-6-(β-sulfoethylamino)-1,3,5-triazine | greenish blue |
| 115 | 2-(4'-Amino-3'-sulfophenylamino)-4-fluoro-6-(β-hydroxyethylamino)-1,3,5-triazine | 2-(3'-Amino-4'-sulfophenylamino)-4-fluoro-6-(2''-sulfophenylamino)-1,3,5-triazine | greenish blue |
| 116 | 2-(4'-Amino-3'-sulfophenylamino)-4-fluoro-6-(β-sulfoethylamino)-1,3,5-triazine | 2-(3'-Amino-4'-sulfophenylamino)-4-fluoro-6-(1''-sulfonaphth-2''-ylamino)-1,3,5-triazine | greenish blue |
| 117 | 2-(4'-Amino-3'-sulfophenylamino)-4-fluoro-6-(β-sulfoethylamino)-1,3,5-triazine | 2-(3'-Amino-4'-sulfophenylamino)-4-fluoro-6-(2''-chloro-5''-sulfophenylamino)-1,3,5-triazine | greenish blue |
| 118 | 2-(4'-Amino-3'-sulfophenylamino)-4-fluoro-6-(β-sulfoethylamino)-1,3,5-triazine | 2-(3'-Amino-4'-sulfophenylamino)-4-fluoro-6-(β-hydroxyethylamino)-1,3,5-triazine | greenish blue |
| 119 | 2-(4'-Amino-3'-sulfophenylamino)-4-fluoro-6-(β-sulfoethylamino)-1,3,5-triazine | 2-(3'-Amino-4'-sulfophenylamino)-4-fluoro-6-(β-sulfoethylamino)-1,3,5-triazine | greenish blue |
| 120 | 2-(4'-Amino-3'-sulfophenylamino)-4-fluoro-6-(β-sulfoethylamino)-1,3,5-triazine | 2-(4'-Amino-2',5'-disulfophenylamino)-4-fluoro-6-(2''-sulfophenylamino)-1,3,5-triazine | greenish blue |
| 121 | 2-(4'-Amino-3'-sulfophenylamino)-4-fluoro-6-(β-sulfoethylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 122 | 2-(4'-Amino-3'-sulfophenylamino)-4-fluoro-6-(β-sulfoethylamino)-1,3,5-triazine | 2-(4'-Amino-2',5'-disulfophenylamino)-4-fluoro-6-(2''-chloro-5''-sulfophenylamino)-1,3,5-triazine | greenish blue |
| 123 | 2-(4'-Amino-3'-sulfophenylamino)-4-fluoro-6-(β-sulfoethylamino)-1,3,5-triazine | 2-(4'-Amino-2',5'-disulfophenylamino)-4-fluoro-6-(β-hydroxyethylamino)-1,3,5-triazine | greenish blue |
| 124 | 2-(4'-Amino-3'-sulfophenylamino)-4-fluoro-6-(β-sulfoethylamino)-1,3,5-triazine | 2-(4'-Amino-2',5'-disulfophenylamino)-4-fluoro-6-(β-sulfoethylamino)-1,3,5-triazine | greenish blue |
| 125 | 2-(4'-Amino-2',5'-disulfophenylamino)-4-fluoro-6-(2''-sulfophenylamino)-1,3,5-triazine | 2-(3'-Amino-4'-sulfophenylamino)-4-fluoro-6-(2''-sulfophenylamino)-1,3,5-triazine | greenish blue |
| 126 | 2-(4'-Amino-2',5'-disulfophenylamino)-4-fluoro-6-(2''-sulfophenylamino)-1,3,5-triazine | 2-(3'-Amino-4'-sulfophenylamino)-4-fluoro-6-(1''-sulfonaphth-2''-ylamino)-1,3,5-triazine | greenish blue |
| 127 | 2-(4'-Amino-2',5'-disulfophenylamino)-4-fluoro-6-(2''-sulfophenylamino)-1,3,5-triazine | 2-(3'-Amino-4'-sulfophenylamino)-4-fluoro-6-(2''-chloro-5''-sulfophenylamino)-1,3,5-triazine | greenish blue |
| 128 | 2-(4'-Amino-2',5'-disulfophenylamino)-4-fluoro-6-(2''-sulfophenylamino)-1,3,5-triazine | 2-(3'-Amino-4'-sulfophenylamino)-4-fluoro-6-(β-hydroxyethylamino)-1,3,5-triazine | greenish blue |
| 129 | 2-(4'-Amino-2',5'-disulfophenylamino)-4-fluoro-6-(2''-sulfophenylamino)-1,3,5-triazine | 2-(3'-Amino-4'-sulfophenylamino)-4-fluoro-6-(β-sulfoethylamino)-1,3,5-triazine | greenish blue |
| 130 | 2-(4'-Amino-2',5'-disulfophenylamino)-4-fluoro-6-(2''-sulfophenylamino)-1,3,5-triazine | 2-(4'-Amino-3'-sulfophenylamino)-4-fluoro-6-(2''-sulfophenylamino)-1,3,5-triazine | greenish blue |
| 131 | 2-(4'-Amino-2',5'-disulfophenylamino)-4-fluoro-6-(2''-sulfophenylamino)-1,3,5-triazine | 2-(4'-Amino-3'-sulfophenylamino)-4-fluoro-6-(1''-sulfonaphth-2''-ylamino)-1,3,5-triazine | greenish blue |
| 132 | 2-(4'-Amino-2',5'-disulfophenylamino)-4-fluoro-6-(2''-sulfophenylamino)-1,3,5-triazine | 2-(4'-Amino-3'-sulfophenylamino)-4-fluoro-6-(2''-chloro-5''-sulfophenylamino)-1,3,5-triazine | greenish blue |
| 133 | 2-(4'-Amino-2',5'-disulfophenylamino)-4-fluoro-6-(2''-sulfophenylamino)-1,3,5-triazine | 2-(4'-Amino-3'-sulfophenylamino)-4-fluoro-6-(β-hydroxyethylamino)-1,3,5-triazine | greenish blue |
| 134 | 2-(4'-Amino-2',5'-disulfophenylamino)-4-fluoro-6-(2''-sulfophenylamino)-1,3,5-triazine | 2-(4'-Amino-3'-sulfophenylamino)-4-fluoro-6-(β-sulfoethylamino)-1,3,5-triazine | greenish blue |
| 135 | 2-(4'-Amino-2',5'-disulfophenylamino)-4-fluoro-6-(2''-sulfophenylamino)-1,3,5-triazine | 2-(4'-Amino-2',5'-disulfophenylamino)-4-fluoro-6-(2''-sulfophenylamino)-1,3,5-triazine | greenish blue |
| 136 | 2-(4'-Amino-2',5'-disulfophenylamino)-4-fluoro-6-(2''-sulfophenylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 137 | 2-(4'-Amino-2',5'-disulfophenylamino)-4-fluoro-6-(2''-sulfophenylamino)-1,3,5-triazine | 2-(4'-Amino-2',5'-disulfophenylamino)-4-fluoro-6-(2''-chloro-5''-sulfophenylamino)-1,3,5-triazine | greenish blue |

TABLE 1-continued

| No. | Diazo component | Diazo component | Shade on cotton |
|---|---|---|---|
| 138 | 2-(4'-Amino-2',5'-disulfophenyl-amino)-4-fluoro-6-(2"-sulfo-phenylamino)-1,3,5-triazine | 2-(4'-Amino-2',5'-disulfophenyl-amino)-4-fluoro-6-(β-hydroxyethyl-amino)-1,3,5-triazine | greenish blue |
| 139 | 2-(4'-Amino-2',5'-disulfophenyl-amino)-4-fluoro-6-(2"-sulfo-phenylamino)-1,3,5-triazine | 2-(4'-Amino-2',5'-disulfophenyl-amino)-4-fluoro-6-(β-sulfoethyl-amino)-1,3,5-triazine | greenish blue |
| 140 | 2-(4'-Amino-2',5'-disulfophenyl-amino)-4-fluoro-6-(1"-sulfo-naphth-2"-ylamino)-1,3,5-triazine | 2-(3'-Amino-4'-sulfophenylamino)-4-fluoro-6-(2"-sulfophenylamino)-1,3,5-triazine | greenish blue |
| 141 | 2-(4'-Amino-2',5'-disulfophenyl-amino)-4-fluoro-6-(1"-sulfo-naphth-2"-ylamino)-1,3,5-triazine | 2-(3'-Amino-4'-sulfophenylamino)-4-fluoro-6-(1"-sulfonaphth-2"-yl-amino)-1,3,5-triazine | greenish blue |
| 142 | 2-(4'-Amino-2',5'-disulfophenyl-amino)-4-fluoro-6-(1"-sulfo-naphth-2"-ylamino)-1,3,5-triazine | 2-(3'-Amino-4'-sulfophenylamino)-4-fluoro-6-(2"-chloro-5"-sulfo-phenylamino)-1,3,5-triazine | greenish blue |
| 143 | 2-(4'-Amino-2',5'-disulfophenyl-amino)-4-fluoro-6-(1"-sulfo-naphth-2"-ylamino)-1,3,5-triazine | 2-(3'-Amino-4'-sulfophenylamino)-4-fluoro-6-(β-hydroxyethylamino)-1,3,5-triazine | greenish blue |
| 144 | 2-(4'-Amino-2',5'-disulfophenyl-amino)-4-fluoro-6-(1"-sulfo-naphth-2"-ylamino)-1,3,5-triazine | 2-(3'-Amino-4'-sulfophenylamino)-4-fluoro-6-(β-sulfoethylamino)-1,3,5-triazine | greenish blue |
| 145 | 2-(4'-Amino-2',5'-disulfophenyl-amino)-4-fluoro-6-(1"-sulfo-naphth-2"-ylamino)-1,3,5-triazine | 2-(4'-Amino-3'-sulfophenylamino)-4-fluoro-6-(2"-sulfophenylamino)-1,3,5-triazine | greenish blue |
| 146 | 2-(4'-Amino-2',5'-disulfophenyl-amino)-4-fluoro-6-(1"-sulfo-naphth-2"-ylamino)-1,3,5-triazine | 2-(4'-Amino-3'-sulfophenylamino)-4-fluoro-6-(1"-sulfonaphth-2"-yl-amino)-1,3,5-triazine | greenish blue |
| 147 | 2-(4'-Amino-2',5'-disulfophenyl-amino)-4-fluoro-6-(1"-sulfo-naphth-2"-ylamino)-1,3,5-triazine | 2-(4'-Amino-3'-sulfophenylamino)-4-fluoro-6-(2"-chloro-5"-sulfo-phenylamino)-1,3,5-triazine | greenish blue |
| 148 | 2-(4'-Amino-2',5'-disulfophenyl-amino)-4-fluoro-6-(1"-sulfo-naphth-2"-ylamino)-1,3,5-triazine | 2-(4'-Amino-3'-sulfophenylamino)-4-fluoro-6-(β-hydroxyethylamino)-1,3,5-triazine | greenish blue |
| 149 | 2-(4'-Amino-2',5'-disulfophenyl-amino)-4-fluoro-6-(1"-sulfo-naphth-2"-ylamino)-1,3,5-triazine | 2-(4'-Amino-3'-sulfophenylamino)-4-fluoro-6-(β-sulfoethylamino)-1,3,5-triazine | greenish blue |
| 150 | 2-(4'-Amino-2',5'-disulfophenyl-amino)-4-fluoro-6-(1"-sulfo-naphth-2"-ylamino)-1,3,5-triazine | 2-(4'-Amino-2',5'-disulfophenyl-amino)-4-fluoro-6-(2"-sulfophenyl-amino)-1,3,5-triazine | greenish blue |
| 151 | 2-(4'-Amino-2',5'-disulfophenyl-amino)-4-fluoro-6-(1"-sulfo-naphth-2"-ylamino)-1,3,5-triazine | 2-(4'-Amino-2',5'-disulfophenyl-amino)-4-fluoro-6-(1"-sulfonaphth-2"-ylamino)-1,3,5-triazine | greenish blue |
| 152 | 2-(4'-Amino-2',5'-disulfophenyl-amino)-4-fluoro-6-(1"-sulfo-naphth-2"-ylamino)-1,3,5-triazine | 2-(4'-Amino-2',5'-disulfophenyl-amino)-4-fluoro-6-(2"-chloro-5"-sulfophenylamino)-1,3,5-triazine | greenish blue |
| 153 | 2-(4'-Amino-2',5'-disulfophenyl-amino)-4-fluoro-6-(1"-sulfo-naphth-2"-ylamino)-1,3,5-triazine | 2-(4'-Amino-2',5'-disulfophenyl-amino)-4-fluoro-6-(β-hydroxyethyl-amino)-1,3,5-triazine | greenish blue |
| 154 | 2-(4'-Amino-2',5'-disulfophenyl-amino)-4-fluoro-6-(1"-sulfo-naphth-2"-ylamino)-1,3,5-triazine | 2-(4'-Amino-2',5'-disulfophenyl-amino)-4-fluoro-6-(β-sulfoethyl-amino)-1,3,5-triazine | greenish blue |
| 155 | 2-(4'-Amino-2',5'-disulfophenyl-amino)-4-fluoro-6-(2"-chloro-5"-sulfophenylamino)-1,3,5-triazine | 2-(3'-Amino-4'-sulfophenylamino)-4-fluoro-6-(2"-sulfophenylamino)-1,3,5-triazine | greenish blue |
| 156 | 2-(4'-Amino-2',5'-disulfophenyl-amino)-4-fluoro-6-(2"-chloro-5"-sulfophenylamino)-1,3,5-triazine | 2-(3'-Amino-4'-sulfophenylamino)-4-fluoro-6-(1"-sulfonaphth-2"-yl-amino)-1,3,5-triazine | greenish blue |
| 157 | 2-(4'-Amino-2',5'-disulfophenyl-amino)-4-fluoro-6-(2"-chloro-5"-sulfophenylamino)-1,3,5-triazine | 2-(3'-Amino-4'-sulfophenylamino)-4-fluoro-6-(2"-chloro-5"-sulfo-phenylamino)-1,3,5-triazine | greenish blue |
| 158 | 2-(4'-Amino-2',5'-disulfophenyl-amino)-4-fluoro-6-(2"-chloro-5"-sulfophenylamino)-1,3,5-triazine | 2-(3'-Amino-4'-sulfophenylamino)-4-fluoro-6-(β-hydroxyethylamino)-1,3,5-triazine | greenish blue |
| 159 | 2-(4'-Amino-2',5'-disulfophenyl-amino)-4-fluoro-6-(2"-chloro-5"-sulfophenylamino)-1,3,5-triazine | 2-(3'-Amino-4'-sulfophenylamino)-4-fluoro-6-(β-sulfoethylamino)-1,3,5-triazine | greenish blue |
| 160 | 2-(4'-Amino-2',5'-disulfophenyl-amino)-4-fluoro-6-(2"-chloro-5"-sulfophenylamino)-1,3,5-triazine | 2-(4'-Amino-3'-sulfophenylamino)-4-fluoro-6-(2"-sulfophenylamino)-1,3,5-triazine | greenish blue |
| 161 | 2-(4'-Amino-2',5'-disulfophenyl-amino)-4-fluoro-6-(2"-chloro-5"-sulfophenylamino)-1,3,5-triazine | 2-(4'-Amino-3'-sulfophenylamino)-4-fluoro-6-(1"-sulfonaphth-2"-yl-amino)-1,3,5-triazine | greenish blue |
| 162 | 2-(4'-Amino-2',5'-disulfophenyl-amino)-4-fluoro-6-(2"-chloro-5"-sulfophenylamino)-1,3,5-triazine | 2-(4'-Amino-3'-sulfophenylamino)-4-fluoro-6-(2"-chloro-5"-sulfo-phenylamino)-1,3,5-triazine | greenish blue |
| 163 | 2-(4'-Amino-2',5'-disulfophenyl-amino)-4-fluoro-6-(2"-chloro-5"-sulfophenylamino)-1,3,5-triazine | 2-(4'-Amino-3'-sulfophenylamino)-4-fluoro-6-(β-hydroxyethylamino)-1,3,5-triazine | greenish blue |
| 164 | 2-(4'-Amino-2',5'-disulfophenyl-amino)-4-fluoro-6-(2"-chloro-5"-sulfophenylamino)-1,3,5-triazine | 2-(4'-Amino-3'-sulfophenylamino)-4-fluoro-6-(β-sulfoethylamino)-1,3,5-triazine | greenish blue |

TABLE 1-continued

| No. | Diazo component | Diazo component | Shade on cotton |
|---|---|---|---|
| 165 | 2-(4'-Amino-2',5'-disulfophenyl-amino)-4-fluoro-6-(2''-chloro-5''-sulfophenylamino)-1,3,5-triazine | 2-(4'-Amino-2',5'-disulfophenyl-amino)-4-fluoro-6-(2''-sulfophenyl-amino)-1,3,5-triazine | greenish blue |
| 166 | 2-(4'-Amino-2',5'-disulfophenyl-amino)-4-fluoro-6-(2''-chloro-5''-sulfophenylamino)-1,3,5-triazine | 2-(4'-Amino-2',5'-disulfophenyl-amino)-4-fluoro-6-(1''-sulfonaphth-2''-ylamino)-1,3,5-triazine | greenish blue |
| 167 | 2-(4'-Amino-2',5'-disulfophenyl-amino)-4-fluoro-6-(2''-chloro-5''-sulfophenylamino)-1,3,5-triazine | 2-(4'-Amino-2',5'-disulfophenyl-amino)-4-fluoro-6-(2''-chloro-5''-sulfophenylamino)-1,3,5-triazine | greenish blue |
| 168 | 2-(4'-Amino-2',5'-disulfophenyl-amino)-4-fluoro-6-(2''-chloro-5''-sulfophenylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 169 | 2-(4'-Amino-2',5'-disulfophenyl-amino)-4-fluoro-6-(2''-chloro-5''-sulfophenylamino)-1,3,5-triazine | 2-(4'-Amino-2',5'-disulfophenyl-amino)-4-fluoro-6-($\beta$-sulfoethyl-amino)-1,3,5-triazine | greenish blue |
| 170 | 2-(4'-Amino-2',5'-disulfophenyl-amino)-4-fluoro-6-($\beta$-hydroxyethyl-amino)-1,3,5-triazine | 2-(3'-Amino-4'-sulfophenylamino)-4-fluoro-6-(2''-sulfophenylamino)-1,3,5-triazine | greenish blue |
| 171 | 2-(4'-Amino-2',5'-disulfophenyl-amino)-4-fluoro-6-($\beta$-hydroxy-ethylamino)-1,3,5-triazine | 2-(3'-Amino-4'-sulfophenylamino)-4-fluoro-6-(1''-sulfonaphth-2''-yl-amino)-1,3,5-triazine | greenish blue |
| 172 | 2-(4'-Amino-2',5'-disulfophenyl-amino)-4-fluoro-6-($\beta$-hydroxy-ethylamino)-1,3,5-triazine | 2-(3'-Amino-4'-sulfophenylamino)-4-fluoro-6-(2''-chloro-5''-sulfo-phenylamino)-1,3,5-triazine | greenish blue |
| 173 | 2-(4'-Amino-2',5'-disulfophenyl-amino)-4-fluoro-6-($\beta$-hydroxy-ethylamino)-1,3,5-triazine | 2-(3'-Amino-4'-sulfophenylamino)-4-fluoro-6-($\beta$-hydroxyethylamino)-1,3,5-triazine | greenish blue |
| 174 | 2-(4'-Amino-2',5'-disulfophenyl-amino)-4-fluoro-6-($\beta$-hydroxy-ethylamino)-1,3,5-triazine | 2-(3'-Amino-4'-sulfophenylamino)-4-fluoro-6-($\beta$-sulfoethylamino)-1,3,5-triazine | greenish blue |
| 175 | 2-(4'-Amino-2',5'-disulfophenyl-amino)-4-fluoro-6-($\beta$-hydroxy-ethylamino)-1,3,5-triazine | 2-(4'-Amino-3'-sulfophenylamino)-4-fluoro-6-(2''-sulfophenylamino)-1,3,5-triazine | greenish blue |
| 176 | 2-(4'-Amino-2',5'-disulfophenyl-amino)-4-fluoro-6-($\beta$-hydroxy-ethylamino)-1,3,5-triazine | 2-(4'-Amino-3'-sulfophenylamino)-4-fluoro-6-(1''-sulfonaphth-2''-yl-amino)-1,3,5-triazine | greenish blue |
| 177 | 2-(4'-Amino-2',5'-disulfophenyl-amino)-4-fluoro-6-($\beta$-hydroxy-ethylamino)-1,3,5-triazine | 2-(4'-Amino-3'-sulfophenylamino)-4-fluoro-6-(2''-chloro-5''-sulfo-phenylamino)-1,3,5-triazine | greenish blue |
| 178 | 2-(4'-Amino-2',5'-disulfophenyl-amino)-4-fluoro-6-($\beta$-hydroxy-ethylamino)-1,3,5-triazine | 2-(4'-Amino-3'-sulfophenylamino)-4-fluoro-6-($\beta$-hydroxyethylamino)-1,3,5-triazine | greenish blue |
| 179 | 2-(4'-Amino-2',5'-disulfophenyl-amino)-4-fluoro-6-($\beta$-hydroxy-ethylamino)-1,3,5-triazine | 2-(4'-Amino-3'-sulfophenylamino)-4-fluoro-6-($\beta$-sulfoethylamino)-1,3,5-triazine | greenish blue |
| 180 | 2-(4'-Amino-2',5'-disulfophenyl-amino)-4-fluoro-6-($\beta$-hydroxy-ethylamino)-1,3,5-triazine | 2-(4'-Amino-2',5'-disulfophenyl-amino)-4-fluoro-6-(2''-sulfophenyl-amino)-1,3,5-triazine | greenish blue |
| 181 | 2-(4'-Amino-2',5'-disulfophenyl-amino)-4-fluoro-6-($\beta$-hydroxy-ethylamino)-1,3,5-triazine | 2-(4'-Amino-2',5'-disulfophenyl-amino)-4-fluoro-6-(1''-sulfonaphth-2''-ylamino)-1,3,5-triazine | greenish blue |
| 182 | 2-(4'-Amino-2',5'-disulfophenyl-amino)-4-fluoro-6-($\beta$-hydroxy-ethylamino)-1,3,5-triazine | 2-(4'-Amino-2',5'-disulfophenyl-amino)-4-fluoro-6-(2''-chloro-5''-sulfophenylamino)-1,3,5-triazine | greenish blue |
| 183 | 2-(4'-Amino-2',5'-disulfophenyl-amino)-4-fluoro-6-($\beta$-hydroxy-ethylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 184 | 2-(4'-Amino-2',5'-disulfophenyl-amino)-4-fluoro-6-($\beta$-hydroxy-ethylamino)-1,3,5-triazine | 2-(4'-Amino-2',5'-disulfophenyl-amino)-4-fluoro-6-($\beta$-sulfoethyl-amino)-1,3,5-triazine | greenish blue |
| 185 | 2-(4'-Amino-2',5'-disulfophenyl-amino)-4-fluoro-6-($\beta$-sulfoethyl-amino)-1,3,5-triazine | 2-(3'-Amino-4'-sulfophenylamino)-4-fluoro-6-(2''-sulfophenylamino)-1,3,5-triazine | greenish blue |
| 186 | 2-(4'-Amino-2',5'-disulfophenyl-amino)-4-fluoro-6-($\beta$-sulfoethyl-amino)-1,3,5-triazine | 2-(3'-Amino-4'-sulfophenylamino)-4-fluoro-6-(1''-sulfonaphth-2''-yl-amino)-1,3,5-triazine | greenish blue |
| 187 | 2-(4'-Amino-2',5'-disulfophenyl-amino)-4-fluoro-6-($\beta$-sulfoethyl-amino)-1,3,5-triazine | 2-(3'-Amino-4'-sulfophenylamino)-4-fluoro-6-(2''-chloro-5''-sulfo-phenylamino)-1,3,5-triazine | greenish blue |
| 188 | 2-(4'-Amino-2',5'-disulfophenyl-amino)-4-fluoro-6-($\beta$-sulfoethyl-amino)-1,3,5-triazine | 2-(3'-Amino-4'-sulfophenylamino)-4-fluoro-6-($\beta$-hydroxyethylamino)-1,3,5-triazine | greenish blue |
| 189 | 2-(4'-Amino-2',5'-disulfophenyl-amino)-4-fluoro-6-($\beta$-sulfoethyl-amino)-1,3,5-triazine | 2-(3'-Amino-4'-sulfophenylamino)-4-fluoro-6-($\beta$-sulfoethylamino-1,3,5-triazine | greenish blue |
| 190 | 2-(4'-Amino-2',5'-disulfophenyl-amino)-4-fluoro-6-($\beta$-sulfoethyl-amino)-1,3,5-triazine | 2-(4'-Amino-3'-sulfophenylamino)-4-fluoro-6-(2''-sulfophenylamino)-1,3,5-triazine | greenish blue |
| 191 | 2-(4'-Amino-2',5'-disulfophenyl-amino)-4-fluoro-6-($\beta$-sulfoethyl-amino)-1,3,5-triazine | 2-(4'-Amino-3'-sulfophenylamino)-4-fluoro-6-(1''-sulfonaphth-2''-yl-amino)-1,3,5-triazine | greenish blue |

TABLE 1-continued

| No. | Diazo component | Diazo component | Shade on cotton |
|---|---|---|---|
| 192 | 2-(4'-Amino-2',5'-disulfophenyl-amino)-4-fluoro-6-(β-sulfoethyl-amino)-1,3,5-triazine | 2-(4'-Amino-3'-sulfophenylamino)-4-fluoro-6-(2''-chloro-5''-sulfo-phenylamino)-1,3,5-triazine | greenish blue |
| 193 | 2-(4'-Amino-2',5'-disulfophenyl-amino)-4-fluoro-6-(β-sulfoethyl-amino)-1,3,5-triazine | 2-(4'-Amino-3'-sulfophenylamino)-4-fluoro-6-(β-hydroxyethylamino)-1,3,5-triazine | greenish blue |
| 194 | 2-(4'-Amino-2',5'-disulfophenyl-amino)-4-fluoro-6-(β-sulfoethyl-amino)-1,3,5-triazine | 2-(4'-Amino-3'-sulfophenylamino)-4-fluoro-6-(β-sulfoethylamino)-1,3,5-triazine | greenish blue |
| 195 | 2-(4'-Amino-2',5'-disulfophenyl-amino)-4-fluoro-6-(β-sulfoethyl-amino)-1,3,5-triazine | 2-(4'-Amino-2',5'-disulfophenyl-amino)-4-fluoro-6-(2''-sulfophenyl-amino)-1,3,5-triazine | greenish blue |
| 196 | 2-(4'-Amino-2',5'-disulfophenyl-amino)-4-fluoro-6-(β-sulfoethyl-amino)-1,3,5-triazine | 2-(4'-Amino-2',5'-disulfophenyl-amino)-4-fluoro-6-(1''-sulfonaphth-2''-ylamino)-1,3,5-triazine | greenish blue |
| 197 | 2-(4'-Amino-2',5'-disulfophenyl-amino)-4-fluoro-6-(β-sulfoethyl-amino)-1,3,5-triazine | 2-(4'-Amino-2',5'-disulfophenyl-amino)-4-fluoro-6-(2''-chloro-5''-sulfophenylamino)-1,3,5-triazine | greenish blue |
| 198 | 2-(4'-Amino-2',5'-disulfophenyl-amino)-4-fluoro-6-(β-sulfoethyl-amino)-1,3,5-triazine | 2-(4'-Amino-2',5'-disulfophenyl-amino)-4-fluoro-6-(β-hydroxyethyl-amino)-1,3,5-triazine | greenish blue |
| 199 | 2-(4'-Amino-2',5'-disulfophenyl-amino)-4-fluoro-6-(β-sulfoethyl-amino)-1,3,5-triazine | 2-(4'-Amino-2',5'-disulfophenyl-amino)-4-fluoro-6-(β-sulfoethyl-amino)-1,3,5-triazine | greenish blue |
| 200 | 2-(3'-Amino-4'-sulfophenylamino)-4-fluoro-6-(1''-sulfonaphth-2''-yl-amino)-1,3,5-triazine | 2-(3'-Amino-4'-sulfophenylamino)-4-fluoro-6-(2''-sulfophenylamino)-1,3,5-triazine | blue |
| 201 | 2-(3'-Amino-4'-sulfophenylamino)-4-fluoro-6-(2''-chloro-5''-sulfo-phenylamino)-1,3,5-triazine | 2-(3'-Amino-4'-sulfophenylamino)-4-fluoro-6-(2''-sulfophenylamino)-1,3,5-triazine | blue |
| 202 | 2-(3'-Amino-4'-sulfophenylamino)-4-fluoro-6-(β-hydroxyethylamino)-1,3,5-triazine | 2-(3'-Amino-4'-sulfophenylamino)-4-fluoro-6-(2''-sulfophenylamino)-1,3,5-triazine | blue |
| 203 | 2-(3'-Amino-4'-sulfophenylamino)-4-fluoro-6-(β-sulfoethylamino)-1,3,5-triazine | 2-(3'-Amino-4'-sulfophenylamino)-4-fluoro-6-(2''-sulfophenylamino)-1,3,5-triazine | blue |
| 204 | 2-(4'-Amino-3'-sulfophenylamino)-4-fluoro-6-(2''-sulfophenylamino)-1,3,5-triazine | 2-(3'-Amino-4'-sulfophenylamino)-4-fluoro-6-(2''-sulfophenylamino)-1,3,5-triazine | greenish blue |
| 205 | 2-(4'-Amino-3'-sulfophenylamino)-4-fluoro-6-(1''-sulfonaphth-2''-yl-amino)-1,3,5-triazine | 2-(3'-Amino-4'-sulfophenylamino)-4-fluoro-6-(2''-sulfophenylamino)-1,3,5-triazine | greenish blue |
| 206 | 2-(4'-Amino-3'-sulfophenylamino)-4-fluoro-6-(2''-chloro-5''-sulfo-phenylamino)-1,3,5-triazine | 2-(3'-Amino-4'-sulfophenylamino)-4-fluoro-6-(2''-sulfophenylamino)-1,3,5-triazine | greenish blue |
| 207 | 2-(4'-Amino-3'-sulfophenylamino)-4-fluoro-6-(β-hydroxyethylamino)-1,3,5-triazine | 2-(3'-Amino-4'-sulfophenylamino)-4-fluoro-6-(2''-sulfophenylamino)-1,3,5-triazine | greenish blue |
| 208 | 2-(4'-Amino-3'-sulfophenylamino)-4-fluoro-6-(β-sulfoethylamino)-1,3,5-triazine | 2-(3'-Amino-4'-sulfophenylamino)-4-fluoro-6-(2''-sulfophenylamino)-1,3,5-triazine | greenish blue |
| 209 | 2-(4'-Amino-2',5'-disulfophenyl-amino)-4-fluoro-6-(2''-sulfo-phenylamino)-1,3,5-triazine | 2-(3'-Amino-4'-sulfophenylamino)-4-fluoro-6-(2''-sulfophenylamino)-1,3,5-triazine | greenish blue |
| 210 | 2-(4'-Amino-2',5'-disulfophenyl-amino)-4-fluoro-6-(1''-sulfonaphth-2''-ylamino)-1,3,5-triazine | 2-(3'-Amino-4'-sulfophenylamino)-4-fluoro-6-(2''-sulfophenylamino)-1,3,5-triazine | greenish blue |
| 211 | 2-(4'-Amino-2',5'-disulfophenyl-amino)-4-fluoro-6-(2''-chloro-5''-sulfophenylamino)-1,3,5-triazine | 2-(3'-Amino-4'-sulfophenylamino)-4-fluoro-6-(2''-sulfophenylamino)-1,3,5-triazine | greenish blue |
| 212 | 2-(4'-Amino-2',5'-disulfophenyl-amino)-4-fluoro-6-(β-hydroxyethyl-amino)-1,3,5-triazine | 2-(3'-Amino-4'-sulfophenylamino)-4-fluoro-6-(2''-sulfophenylamino)-1,3,5-triazine | greenish blue |
| 213 | 2-(4'-Amino-2',5'-disulfophenyl-amino)-4-fluoro-6-(β-sulfoethyl-amino)-1,3,5-triazine | 2-(3'-Amino-4'-sulfophenylamino)-4-fluoro-6-(2''-sulfophenylamino)-1,3,5-triazine | greenish blue |
| 214 | 2-(3'-Amino-4'-sulfophenylamino)-4-fluoro-6-(2''-sulfophenylamino)-1,3,5-triazine | 2-(3'-Amino-4'-sulfophenylamino)-4-fluoro-6-(1''-sulfonaphth-2''-yl-amino)-1,3,5-triazine | blue |
| 215 | 2-(3'-Amino-4'-sulfophenylamino)-4-fluoro-6-(2''-chloro-5''-sulfo-phenylamino)-1,3,5-triazine | 2-(3'-Amino-4'-sulfophenylamino)-4-fluoro-6-(1''-sulfonaphth-2''-yl-amino)-1,3,5-triazine | blue |
| 216 | 2-(3'-Amino-4'-sulfophenylamino)-4-fluoro-6-(β-hydroxyethylamino)-1,3,5-triazine | 2-(3'-Amino-4'-sulfophenylamino)-4-fluoro-6-(1''-sulfonaphth-2''-yl-amino)-1,3,5-triazine | blue |
| 217 | 2-(3'-Amino-4'-sulfophenylamino)-4-fluoro-6-(β-sulfoethylamino)-1,3,5-triazine | 2-(3'-Amino-4'-sulfophenylamino)-4-fluoro-6-(1''-sulfonaphth-2''-yl-amino)-1,3,5-triazine | blue |
| 218 | 2-(4'-Amino-3'-sulfophenylamino)-4-fluoro-6-(2''-sulfophenylamino)-1,3,5-triazine | 2-(3'-Amino-4'-sulfophenylamino)-4-fluoro-6-(1''-sulfonaphth-2''-yl-amino)-1,3,5-triazine | greenish blue |

TABLE 1-continued

| No. | Diazo component | Diazo component | Shade on cotton |
|---|---|---|---|
| 219 | 2-(4'-Amino-3'-sulfophenylamino)-4-fluoro-6-(1''-sulfonaphth-2''-yl-amino)-1,3,5-triazine | 2-(3'-Amino-4'-sulfophenylamino)-4-fluoro-6-(1''-sulfonaphth-2''-yl-amino)-1,3,5-triazine | greenish blue |
| 220 | 2-(4'-Amino-3'-sulfophenylamino)-4-fluoro-6-(2''-chloro-5''-sulfophenylamino)-1,3,5-triazine | 2-(3'-Amino-4'-sulfophenylamino)-4-fluoro-6-(1''-sulfonaphth-2''-yl-amino)-1,3,5-triazine | greenish blue |
| 221 | 2-(4'-Amino-3'-sulfophenylamino)-4-fluoro-6-($\beta$-hydroxyethylamino)-1,3,5-triazine | 2-(3'-Amino-4'-sulfophenylamino)-4-fluoro-6-(1''-sulfonaphth-2''-yl-amino)-1,3,5-triazine | greenish blue |
| 222 | 2-(4'-Amino-3'-sulfophenylamino)-4-fluoro-6-($\beta$-sulfoethylamino)-1,3,5-triazine | 2-(3'-Amino-4'-sulfophenylamino)-4-fluoro-6-(1''-sulfonaphth-2''-yl-amino)-1,3,5-triazine | greenish blue |
| 223 | 2-(4'-Amino-2',5'-disulfophenylamino)-4-fluoro-6-(2''-sulfophenylamino)-1,3,5-triazine | 2-(3'-Amino-4'-sulfophenylamino)-4-fluoro-6-(1''-sulfonaphth-2''-yl-amino)-1,3,5-triazine | greenish blue |
| 224 | 2-(4'-Amino-2',5'-disulfophenylamino)-4-fluoro-6-(1''-sulfonaphth-2''-ylamino)-1,3,5-triazine | 2-(3'-Amino-4'-sulfophenylamino)-4-fluoro-6-(1''-sulfonaphth-2''-yl-amino)-1,3,5-triazine | greenish blue |
| 225 | 2-(4'-Amino-2',5'-disulfophenylamino)-4-fluoro-6-(2''-chloro-5''-sulfophenylamino)-1,3,5-triazine | 2-(3'-Amino-4'-sulfophenylamino)-4-fluoro-6-(1''-sulfonaphth-2''-yl-amino)-1,3,5-triazine | greenish blue |
| 226 | 2-(4'-Amino-2',5'-disulfophenylamino)-4-fluoro-6-($\beta$-hydroxyethylamino)-1,3,5-triazine | 2-(3'-Amino-4'-sulfophenylamino)-4-fluoro-6-(1''-sulfonaphth-2''-yl-amino)-1,3,5-triazine | greenish blue |
| 227 | 2-(4'-Amino-2',5'-disulfophenylamino)-4-fluoro-6-($\beta$-sulfoethylamino)-1,3,5-triazine | 2-(3'-Amino-4'-sulfophenylamino)-4-fluoro-6-(1''-sulfonaphth-2''-yl-amino)-1,3,5-triazine | greenish blue |
| 228 | 2-(3'-Amino-4'-sulfophenylamino)-4-fluoro-6-(2''-sulfophenylamino)-1,3,5-triazine | 2-(3'-Amino-4'-sulfophenylamino)-4-fluoro-6-(2''-chloro-5''-sulfophenylamino)-1,3,5-triazine | blue |
| 229 | 2-(3'-Amino-4'-sulfophenylamino)-4-fluoro-6-(1''-sulfonaphth-2''-yl-1,3,5-triazine | 2-(3'-Amino-4'-sulfophenylamino)-4-fluoro-6-(2''-chloro-5''-sulfophenylamino)-1,3,5-triazine | blue |
| 230 | 2-(3'-Amino-4'-sulfophenylamino)-4-fluoro-6-($\beta$-hydroxyethylamino)-1,3,5-triazine | 2-(3'-Amino-4'-sulfophenylamino)-4-fluoro-6-(2''-chloro-5''-sulfophenylamino)-1,3,5-triazine | blue |
| 231 | 2-(3'-Amino-4'-sulfophenylamino)-4-fluoro-6-($\beta$-sulfoethylamino)-1,3,5-triazine | 2-(3'-Amino-4'-sulfophenylamino)-4-fluoro-6-(2''-chloro-5''-sulfophenylamino)-1,3,5-triazine | blue |
| 232 | 2-(4'-Amino-3'-sulfophenylamino)-4-fluoro-6-(2''-sulfophenylamino)-1,3,5-triazine | 2-(3'-Amino-4'-sulfophenylamino)-4-fluoro-6-(2''-chloro-5''-sulfophenylamino)-1,3,5-triazine | greenish blue |
| 233 | 2-(4'-Amino-3'-sulfophenylamino)-4-fluoro-6-(1''-sulfonaphth-2''yl-amino)-1,3,5-triazine | 2-(3'-Amino-4'-sulfophenylamino)-4-fluoro-6-(2''-chloro-5''-sulfophenylamino)-1,3,5-triazine | greenish blue |
| 234 | 2-(4'-Amino-3'-sulfophenylamino)-4-fluoro-6-(2''-chloro-5''-sulfophenylamino)-1,3,5-triazine | 2-(3'-Amino-4'-sulfophenylamino)-4-fluoro-6-(2''-chloro-5''-sulfophenylamino)-1,3,5-triazine | greenish blue |
| 235 | 2-(4'-Amino-3'-sulfophenylamino)-4-fluoro-6-($\beta$-hydroxyethylamino)-1,3,5-triazine | 2-(3'-Amino-4'-sulfophenylamino)-4-fluoro-6-(2''-chloro-5''-sulfophenylamino)-1,3,5-triazine | greenish blue |
| 236 | 2-(4'-Amino-3'-sulfophenylamino)-4-fluoro-6-($\beta$-sulfoethylamino)-1,3,5-triazine | 2-(3'-Amino-4'-sulfophenylamino)-4-fluoro-6-(2''-chloro-5''-sulfophenylamino)-1,3,5-triazine | greenish blue |
| 237 | 2-(4'-Amino-4',5'-disulfophenylamino)-4-fluoro-6-(2''-sulfophenylamino)-1,3,5-triazine | 2-(3'-Amino-4'-sulfophenylamino)-4-fluoro-6-(2''-chloro-5''-sulfophenylamino)-1,3,5-triazine | greenish blue |
| 238 | 2-(4'-Amino-2',5'-disulfophenylamino)-4-fluoro-6-(1''-sulfonaphth-2''-ylamino)-1,3,5-triazine | 2-(3'-Amino-4'-sulfophenylamino)-4-fluoro-6-(2''-chloro-5''-sulfophenylamino)-1,3,5-triazine | greenish blue |
| 239 | 2-(4'-Amino-2',5'-disulfophenylamino)-4-fluoro-6-(2''-chloro-5''-sulfophenylamino)-1,3,5-triazine | 2-(3'-Amino-4'-sulfophenylamino)-4-fluoro-6-(2''-chloro-5''-sulfophenylamino)-1,3,5-triazine | greenish blue |
| 240 | 2-(4'-Amino-2',5'-disulfophenylamino)-4-fluoro-6-($\beta$-hydroxyethylamino)-1,3,5-triazine | 2-(3'-Amino-4'-sulfophenylamino)-4-fluoro-6-(2''-chloro-5''-sulfophenylamino)-1,3,5-triazine | greenish blue |
| 241 | 2-(4'-Amino-2',5'-disulfophenylamino)-4-fluoro-6-($\beta$-sulfoethylamino)-1,3,5-triazine | 2-(3'-Amino-4'-sulfophenylamino)-4-fluoro-6-(2''-chloro-5''-sulfophenylamino)-1,3,5-triazine | greenish blue |
| 242 | 2-(3'-Amino-4'-sulfophenylamino)-4-fluoro-6-(2''-sulfophenylamino)-1,3,5-triazine | 2-(3'-Amino-4'-sulfophenylamino)-4-fluoro-6-($\beta$-hydroxyethylamino)-1,3,5-triazine | blue |
| 243 | 2-(3'-Amino-4'-sulfophenylamino)-4-fluoro-6-(1''-sulfonaphth-2''-yl-amino)-1,3,5-triazine | 2-(3'-Amino-4'-sulfophenylamino)-4-fluoro-6-($\beta$-hydroxyethylamino)-1,3,5-triazine | blue |
| 244 | 2-(3'-Amino-4'-sulfophenylamino)-4-fluoro-6-(2''-chloro-5''-sulfophenylamino)-1,3,5-triazine | 2-(3'-Amino-4'-sulfophenylamino)-4-fluoro-6-($\beta$-hydroxyethylamino)-1,3,5-triazine | blue |
| 245 | 2-(3'-Amino-4'-sulfophenylamino)-4-fluoro-6-($\beta$-sulfoethylamino)-1,3,5-triazine | 2-(3'-Amino-4'-sulfophenylamino)-4-fluoro-6-($\beta$-hydroxyethylamino)-1,3,5-triazine | blue |

TABLE 1-continued

| No. | Diazo component | Diazo component | Shade on cotton |
|---|---|---|---|
| 246 | 2-(4'-Amino-3'-sulfophenylamino)-4-fluoro-6-(2''-sulfophenylamino)-1,3,5-triazine | 2-(3'-Amino-4'-sulfophenylamino)-4-fluoro-6-($\beta$-hydroxyethylamino)-1,3,5-triazine | greenish blue |
| 247 | 2-(4'-Amino-3'-sulfophenylamino)-4-fluoro-6-(1''-sulfonaphth-2''-yl-amino)-1,3,5-triazine | 2-(3'-Amino-4'-sulfophenylamino)-4-fluoro-6-($\beta$-hydroxyethylamino)-1,3,5-triazine | greenish blue |
| 248 | 2-(4'-Amino-3'-sulfophenylamino)-4-fluoro-6-(2''-chloro-5''-sulfophenylamino)-1,3,5-triazine | 2-(3'-Amino-4'-sulfophenylamino)-4-fluoro-6-($\beta$-hydroxyethylamino)-1,3,5-triazine | greenish blue |
| 249 | 2-(4'-Amino-3'-sulfophenylamino)-4-fluoro-6-($\beta$-hydroxyethylamino)-1,3,5-triazine | 2-(3'-Amino-4'-sulfophenylamino)-4-fluoro-6-($\beta$-hydroxyethylamino)-1,3,5-triazine | greenish blue |
| 250 | 2-(4'-Amino-3'-sulfophenylamino)-4-fluoro-6-($\beta$-sulfoethylamino)-1,3,5-triazine | 2-(3'-Amino-4'-sulfophenylamino)-4-fluoro-6-($\beta$-hydroxyethylamino)-1,3,5-triazine | greenish blue |
| 251 | 2-(4'-Amino-2',5'-disulfophenylamino)-4-fluoro-6-(2''-sulfophenylamino)-1,3,5-triazine | 2-(3'-Amino-4'-sulfophenylamino)-4-fluoro-6-($\beta$-hydroxyethylamino)-1,3,5-triazine | greenish blue |
| 252 | 2-(4'-Amino-2',5'-disulfophenylamino)-4-fluoro-6-(1''-sulfonaphth-2''-ylamino)-1,3,5-triazine | 2-(3'-Amino-4'-sulfophenylamino)-4-fluoro-6-($\beta$-hydroxyethylamino)-1,3,5-triazine | greenish blue |
| 253 | 2-(4'-Amino-2',5'-disulfophenylamino)-4-fluoro-6-(2''-chloro-5''-sulfophenylamino)-1,3,5-triazine | 2-(3'-Amino-4'-sulfophenylamino)-4-fluoro-6-($\beta$-hydroxyethylamino)-1,3,5-triazine | greenish blue |
| 254 | 2-(4'-Amino-2',5'-disulfophenylamino)-4-fluoro-6-($\beta$-hydroxyethylamino)-1,3,5-triazine | 2-(3'-Amino-4'-sulfophenylamino)-4-fluoro-6-($\beta$-hydroxyethylamino)-1,3,5-triazine | greenish blue |
| 255 | 2-(4'-Amino-2',5'-disulfophenylamino)-4-fluoro-6-($\beta$-sulfoethylamino)-1,3,5-triazine | 2-(3'-Amino-4'-sulfophenylamino)-4-fluoro-6-($\beta$-hydroxyethylamino)-1,3,5-triazine | greenish blue |
| 256 | 2-(3'-Amino-4'-sulfophenylamino)-4-fluoro-6-(2''-sulfophenylamino)-1,3,5-triazine | 2-(3'-Amino-4'-sulfophenylamino)-4-fluoro-6-($\beta$-sulfoethylamino)-1,3,5-triazine | blue |
| 257 | 2-(3'-Amino-4'-sulfophenylamino)-4-fluoro-6-(1''-sulfonaphth-2''-yl-amino)-1,3,5-triazine | 2-(3'-Amino-4'-sulfophenylamino)-4-fluoro-6-($\beta$-sulfoethylamino)-1,3,5-triazine | blue |
| 258 | 2-(3'-Amino-4'-sulfophenylamino)-4-fluoro-6-(2''-chloro-5''-sulfophenylamino)-1,3,5-triazine | 2-(3'-Amino-4'-sulfophenylamino)-4-fluoro-6-($\beta$-sulfoethylamino)-1,3,5-triazine | blue |
| 259 | 2-(3'-Amino-4'-sulfophenylamino)-4-fluoro-6-($\beta$-hydroxyethylamino)-1,3,5-triazine | 2-(3'-Amino-4'-sulfophenylamino)-4-fluoro-6-($\beta$-sulfoethylamino)-1,3,5-triazine | blue |
| 260 | 2-(4'-Amino-3'-sulfophenylamino)-4-fluoro-6-(2''-sulfophenylamino)-1,3,5-triazine | 2-(3'-Amino-4'-sulfophenylamino)-4-fluoro-6-($\beta$-sulfoethylamino)-1,3,5-triazine | greenish blue |
| 261 | 2-(4'-Amino-3'-sulfophenylamino)-4-fluoro-6-(1''-sulfonaphth-2''-yl-amino)-1,3,5-triazine | 2-(3'-Amino-4'-sulfophenylamino)-4-fluoro-6-($\beta$-sulfoethylamino)-1,3,5-triazine | greenish blue |
| 262 | 2-(4'-Amino-3'-sulfophenylamino)-4-fluoro-6-(2''-chloro-5''-sulfophenylamino)-1,3,5-triazine | 2-(3'-Amino-4'-sulfophenylamino)-4-fluoro-6-($\beta$-sulfoethylamino)-1,3,5-triazine | greenish blue |
| 263 | 2-(4'-Amino-3'-sulfophenylamino)-4-fluoro-6-($\beta$-hydroxyethylamino)-1,3,5-triazine | 2-(3'-Amino-4'-sulfophenylamino)-4-fluoro-6-($\beta$-sulfoethylamino)-1,3,5-triazine | greenish blue |
| 264 | 2-(4'-Amino-3'-sulfophenylamino)-4-fluoro-6-($\beta$-sulfoethylamino)-1,3,5-triazine | 2-(3'-Amino-4'-sulfophenylamino)-4-fluoro-6-($\beta$-sulfoethylamino)-1,3,5-triazine | greenish blue |
| 265 | 2-(4'-Amino-3'-sulfophenylamino)-4-fluoro-6-(2''-sulfophenylamino)-1,3,5-triazine | 2-(3'-Amino-4'-sulfophenylamino)-4-fluoro-6-($\beta$-sulfoethylamino)-1,3,5-triazine | greenish blue |
| 266 | 2-(4'-Amino-2',5'-disulfophenylamino)-4-fluoro-6-(1''-sulfonaphth-2''-ylamino)-1,3,5-triazine | 2-(3'-Amino-4'-sulfophenylamino)-4-fluoro-6-($\beta$-sulfoethylamino)-1,3,5-triazine | greenish blue |
| 267 | 2-(4'-Amino-2',5'-disulfophenylamino)-4-fluoro-6-(2''-chloro-5''-sulfophenylamino)-1,3,5-triazine | 2-(3'-Amino-4'-sulfophenylamino)-4-fluoro-6-($\beta$-sulfoethylamino)-1,3,5-triazine | greenish blue |
| 268 | 2-(4'-Amino-2',5'-disulfophenylamino)-4-fluoro-6-($\beta$-hydroxyethylamino)-1,3,5-triazine | 2-(3'-Amino-4'-sulfophenylamino)-4-fluoro-6-($\beta$-sulfoethylamino)-1,3,5-triazine | greenish blue |
| 269 | 2-(4'-Amino-2',5'-disulfophenylamino)-4-fluoro-6-($\beta$-sulfoethylamino)-1,3,5-triazine | 2-(3'-Amino-4'-sulfophenylamino)-4-fluoro-6-($\beta$-sulfoethylamino)-1,3,5-triazine | greenish blue |
| 270 | 2-(3'-Amino-4'-sulfophenylamino)-4-fluoro-6-(2''-sulfophenylamino)-1,3,5-triazine | 2-(4'-Amino-3'-sulfophenylamino)-4-fluoro-6-(2''-sulfophenylamino)-1,3,5-triazine | greenish blue |
| 271 | 2-(3'-Amino-4'-sulfophenylamino)-4-fluoro-6-(1''-sulfonaphth-2''-yl-amino)-1,3,5-triazine | 2-(4'-Amino-3'-sulfophenylamino)-4-fluoro-6-(2''-sulfophenylamino)-1,3,5-triazine | greenish blue |
| 272 | 2-(3'-Amino-4'-sulfophenylamino)-4-fluoro-6-(2''-chloro-5''-sulfophenylamino)-1,3,5-triazine | 2-(4'-Amino-3'-sulfophenylamino)-4-fluoro-6-(2''-sulfophenylamino)-1,3,5-triazine | greenish blue |

TABLE 1-continued

| No. | Diazo component | Diazo component | Shade on cotton |
|---|---|---|---|
| 273 | 2-(3'-Amino-4'-sulfophenylamino)-4-fluoro-6-(β-hydroxyethylamino)-1,3,5-triazine | 2-(4'-Amino-3'-sulfophenylamino)-4-fluoro-6-(2''-sulfophenylamino)-1,3,5-triazine | greenish blue |
| 274 | 2-(3'-Amino-4'-sulfophenylamino)-4-fluoro-6-(β-sulfoethylamino)-1,3,5-triazine | 2-(4'-Amino-3'-sulfophenylamino)-4-fluoro-6-(2''-sulfophenylamino)-1,3,5-triazine | greenish blue |
| 275 | 2-(4'-Amino-2',5'-disulfophenylamino)-4-fluoro-6-(2''-sulfophenylamino)-1,3,5-triazine | 2-(4'-Amino-3'-sulfophenylamino)-4-fluoro-6-(2''-sulfophenylamino)-1,3,5-triazine | greenish blue |
| 276 | 2-(4'-Amino-2',5'-disulfophenylamino)-4-fluoro-6-(1''-sulfonaphth-2''-ylamino)-1,3,5-triazine | 2-(4'-Amino-3'-sulfophenylamino)-4-fluoro-6-(2''-sulfophenylamino)-1,3,5-triazine | greenish blue |
| 277 | 2-(4'-Amino-2',5'-disulfophenylamino)-4-fluoro-6-(2''-chloro-5''-sulfophenylamino)-1,3,5-triazine | 2-(4'-Amino-3'-sulfophenylamino)-4-fluoro-6-(2''-sulfophenylamino)-1,3,5-triazine | greenish blue |
| 278 | 2-(4'-Amino-2',5'-disulfophenylamino)-4-fluoro-6-(β-hydroxyethylamino)-1,3,5-triazine | 2-(4'-Amino-3'-sulfophenylamino)-4-fluoro-6-(2''-sulfophenylamino)-1,3,5-triazine | greenish blue |
| 279 | 2-(4'-Amino-2',5'-disulfophenylamino)-4-fluoro-6-(β-sulfoethylamino)-1,3,5-triazine | 2-(4'-Amino-3'-sulfophenylamino)-4-fluoro-6-(2''-sulfophenylamino)-1,3,5-triazine | greenish blue |
| 280 | 2-(3'-Amino-4'-sulfophenylamino)-4-fluoro-6-(2''-sulfophenylamino)-1,3,5-triazine | 2-(4'-Amino-3'-sulfophenylamino)-4-fluoro-6-(1''-sulfonaphth-2''-ylamino)-1,3,5-triazine | greenish blue |
| 281 | 2-(3'-Amino-4'-sulfophenylamino)-4-fluoro-6-(1''-sulfonaphth-2''-ylamino)-1,3,5-triazine | 2-(4'-Amino-3'-sulfophenylamino)-4-fluoro-6-(1''-sulfonaphth-2''-ylamino)-1,3,5-triazine | greenish blue |
| 282 | 2-(3'-Amino-4'-sulfophenylamino)-4-fluoro-6-(2''-chloro-5''-sulfophenylamino)-1,3,5-triazine | 2-(4'-Amino-3'-sulfophenylamino)-4-fluoro-6-(1''-sulfonaphth-2''-ylamino)-1,3,5-triazine | greenish blue |
| 283 | 2-(3'-Amino-4'-sulfophenylamino)-4-fluoro-6-(β-hydroxyethylamino)-1,3,5-triazine | 2-(4'-Amino-3'-sulfophenylamino)-4-fluoro-6-(1''-sulfonaphth-2''-ylamino)-1,3,5-triazine | greenish blue |
| 284 | 2-(3'-Amino-4'-sulfophenylamino)-4-fluoro-6-(β-sulfoethylamino)-1,3,5-triazine | 2-(4'-Amino-3'-sulfophenylamino)-4-fluoro-6-(1''-sulfonaphth-2''-ylamino)-1,3,5-triazine | greenish blue |
| 285 | 2-(4'-Amino-2',5'-disulfophenylamino)-4-fluoro-6-(2''-sulfophenylamino)-1,3,5-triazine | 2-(4'-Amino-3'-sulfophenylamino)-4-fluoro-6-(1''-sulfonaphth-2''-ylamino)-1,3,5-triazine | greenish blue |
| 286 | 2-(4'-Amino-2',5'-disulfophenylamino)-4-fluoro-6-(1''-sulfonaphth-2''-ylamino)-1,3,5-triazine | 2-(4'-Amino-3'-sulfophenylamino)-4-fluoro-6-(1''-sulfonaphth-2''-ylamino)-1,3,5-triazine | greenish blue |
| 287 | 2-(4'-Amino-2',5'-disulfophenylamino)-4-fluoro-6-(2''-chloro-5''-sulfophenylamino)-1,3,5-triazine | 2-(4'-Amino-3'-sulfophenylamino)-4-fluoro-6-(1''-sulfonaphth-2''-ylamino)-1,3,5-triazine | greenish blue . |
| 288 | 2-(4'-Amino-2',5'-disulfophenylamino)-4-fluoro-6-(β-hydroxyethylamino)-1,3,5-triazine | 2-(4'-Amino-3'-sulfophenylamino)-4-fluoro-6-(1''-sulfonaphth-2''-ylamino)-1,3,5-triazine | greenish blue |
| 289 | 2-(4'-Amino-2',5'-disulfophenylamino)-4-fluoro-6-(β-sulfoethylamino)-1,3,5-triazine | 2-(4'-Amino-3'-sulfophenylamino)-4-fluoro-6-(1''-sulfonaphth-2''-ylamino)-1,3,5-triazine | greenish blue |
| 290 | 2-(3'-Amino-4'-sulfophenylamino)-4-fluoro-6-(2''-sulfophenylamino)-1,3,5-triazine | 2-(4'-Amino-3'-sulfophenylamino)-4-fluoro-6-(2''-chloro-5''-sulfophenylamino)-1,3,5-triazine | greenish blue |
| 291 | 2-(3'-Amino-4'-sulfophenylamino)-4-fluoro-6-(1''-sulfonaphth-2''-ylamino)-1,3,5-triazine | 2-(4'-Amino-3'-sulfophenylamino)-4-fluoro-6-(2''-chloro-5''-sulfophenylamino)-1,3,5-triazine | greenish blue |
| 292 | 2-(3'-Amino-4'-sulfophenylamino)-4-fluoro-6-(2''-chloro-5''-sulfophenylamino)-1,3,5-triazine | 2-(4'-Amino-3'-sulfophenylamino)-4-fluoro-6-(2''-chloro-5''-sulfophenylamino)-1,3,5-triazine | greenish blue |
| 293 | 2-(3'-Amino-4'-sulfophenylamino)-4-fluoro-6-(β-hydroxyethylamino)-1,3,5-triazine | 2-(4'-Amino-3'-sulfophenylamino)-4-fluoro-6-(2''-chloro-5''-sulfophenylamino)-1,3,5-triazine | greenish blue |
| 294 | 2-(3'-Amino-4'-sulfophenylamino)-4-fluoro-6-(β-sulfoethylamino)-1,3,5-triazine | 2-(4'-Amino-3'-sulfophenylamino)-4-fluoro-6-(2''-chloro-5''-sulfophenylamino)-1,3,5-triazine | greenish blue |
| 295 | 2-(4'-Amino-2',5'-disulfophenylamino)-4-fluoro-6-(2''-sulfophenylamino)-1,3,5-triazine | 2-(4'-Amino-3'-sulfophenylamino)-4-fluoro-6-(2''-chloro-5''-sulfophenylamino)-1,3,5-triazine | greenish blue |
| 296 | 2-(4'-Amino-2',5'-disulfophenylamino)-4-fluoro-6-(1''-sulfonaphth-2''-ylamino)-1,3,5-triazine | 2-(4'-Amino-3'-sulfophenylamino)-4-fluoro-6-(2''-chloro-5''-sulfophenylamino)-1,3,5-triazine | greenish blue |
| 297 | 2-(4'-Amino-2',5'-disulfophenylamino)-4-fluoro-6-(2''-chloro-5''-sulfophenylamino)-1,3,5-triazine | 2-(4'-Amino-3'-sulfophenylamino)-4-fluoro-6-(2''-chloro-5''-sulfophenylamino)-1,3,5-triazine | greenish blue |
| 298 | 2-(4'-Amino-2',5'-disulfophenylamino)-4-fluoro-6-(β-hydroxyethylamino)-1,3,5-triazine | 2-(4'-Amino-3'-sulfophenylamino)-4-fluoro-6-(2''-chloro-5''-sulfophenylamino)-1,3,5-triazine | greenish blue |
| 299 | 2-(4'-Amino-2',5'-disulfophenylamino)-4-fluoro-6-(β-sulfoethylamino)-1,3,5-triazine | 2-(4'-Amino-3'-sulfophenylamino)-4-fluoro-6-(2''-chloro-5''-sulfophenylamino)-1,3,5-triazine | greenish blue |

TABLE 1-continued

| No. | Diazo component | Diazo component | Shade on cotton |
|-----|----------------|-----------------|-----------------|
| 300 | 2-(3'-Amino-4'-sulfophenylamino)-4-fluoro-6-(2"-sulfophenylamino)-1,3,5-triazine | 2-(4'-Amino-3'-sulfophenylamino)-4-fluoro-6-(β-hydroxyethylamino)-1,3,5-triazine | greenish blue |
| 301 | 2-(3'-Amino-4'-sulfophenylamino)-4-fluoro-6-(1"-sulfonaphth-2"-yl-amino)-1,3,5-triazine | 2-(4'-Amino-3'-sulfophenylamino)-4-fluoro-6-(β-hydroxyethylamino)-1,3,5-triazine | greenish blue |
| 302 | 2-(3'-Amino-4'-sulfophenylamino)-4-fluoro-6-(2"-chloro-5"-sulfophenylamino)-1,3,5-triazine | 2-(4'-Amino-3'-sulfophenylamino)-4-fluoro-6-(β-hydroxyethylamino)-1,3,5-triazine | greenish blue |
| 303 | 2-(3'-Amino-4'-sulfophenylamino)-4-fluoro-6-(β-hydroxyethylamino)-1,3,5-triazine | 2-(4'-Amino-3'-sulfophenylamino)-4-fluoro-6-(β-hydroxyethylamino)-1,3,5-triazine | greenish blue |
| 304 | 2-(3'-Amino-4'-sulfophenylamino)-4-fluoro-6-(β-sulfoethylamino)-1,3,5-triazine | 2-(4'-Amino-3'-sulfophenylamino)-4-fluoro-6-(β-hydroxyethylamino)-1,3,5-triazine | greenish blue |
| 305 | 2-(4'-Amino-2',5'-disulfophenylamino)-4-fluoro-6-(2"-sulfophenylamino)-1,3,5-triazine | 2-(4'-Amino-3'-sulfophenylamino)-4-fluoro-6-(β-hydroxyethylamino)-1,3,5-triazine | greenish blue |
| 306 | 2-(4'-Amino-2',5'-disulfophenylamino)-4-fluoro-6-(1"-sulfonaphth-2"-ylamino)-1,3,5-triazine | 2-(4'-Amino-3'-sulfophenylamino)-4-fluoro-6-(β-hydroxyethylamino)-1,3,5-triazine | greenish blue |
| 307 | 2-(4'-Amino-2',5'-disulfophenylamino)-4-fluoro-6-(2"-chloro-5"-sulfophenylamino)-1,3,5-triazine | 2-(4'-Amino-3'-sulfophenylamino)-4-fluoro-6-(β-hydroxyethylamino)-1,3,5-triazine | greenish blue |
| 308 | 2-(4'-Amino-2',5'-disulfophenylamino)-4-fluoro-6-(β-hydroxyethylamino)-1,3,5-triazine | 2-(4'-Amino-3'-sulfophenylamino)-4-fluoro-6-(β-hydroxyethylamino)-1,3,5-triazine | greenish blue |
| 309 | 2-(4'-Amino-2',5'-disulfophenylamino)-4-fluoro-6-(β-sulfoethylamino)-1,3,5-triazine | 2-(4'-Amino-3'-sulfophenylamino)-4-fluoro-6-(β-hydroxyethylamino)-1,3,5-triazine | greenish blue |
| 310 | 2-(3'-Amino-4'-sulfophenylamino)-4-fluoro-6-(2"-sulfophenylamino)-1,3,5-triazine | 2-(4'-Amino-3'-sulfophenylamino)-4-fluoro-6-(β-sulfoethylamino)-1,3,5-triazine | greenish blue |
| 311 | 2-(3'-Amino-4'-sulfophenylamino)-4-fluoro-6-(1"-sulfonaphth-2"-yl-amino)-1,3,5-triazine | 2-(4'-Amino-3'-sulfophenylamino)-4-fluoro-6-(β-sulfoethylamino)-1,3,5-triazine | greenish blue |
| 312 | 2-(3'-Amino-4'-sulfophenylamino)-4-fluoro-6-(2"-chloro-5"-sulfophenylamino)-1,3,5-triazine | 2-(4'-Amino-3'-sulfophenylamino)-4-fluoro-6-(β-sulfoethylamino)-1,3,5-triazine | greenish blue |
| 313 | 2-(3'-Amino-4'-sulfophenylamino)-4-fluoro-6-(β-hydroxyethylamino)-1,3,5-triazine | 2-(4'-Amino-3'-sulfophenylamino)-4-fluoro-6-(β-sulfoethylamino)-1,3,5-triazine | greenish blue |
| 314 | 2-(3'-Amino-4'-sulfophenylamino)-4-fluoro-6-(β-sulfoethylamino)-1,3,5-triazine | 2-(4'-Amino-3'-sulfophenylamino)-4-fluoro-6-(β-sulfoethylamino)-1,3,5-triazine | greenish blue |
| 315 | 2-(4'-Amino-2',5'-disulfophenylamino)-4-fluoro-6-(2"-sulfophenylamino)-1,3,5-triazine | 2-(4'-Amino-3'-sulfophenylamino)-4-fluoro-6-(β-sulfoethylamino)-1,3,5-triazine | greenish blue |
| 316 | 2-(4'-Amino-2',5'-disulfophenylamino)-4-fluoro-6-(1"-sulfonaphth-2"-ylamino-1,3,5-triazine | 2-(4'-Amino-3'-sulfophenylamino)-4-fluoro-6-(β-sulfoethylamino)-1,3,5-triazine | greenish blue |
| 317 | 2-(4'-Amino-2',5'-disulfophenylamino)-4-fluoro-6-(2"-chloro-5"-sulfophenylamino)-1,3,5-triazine | 2-(4'-Amino-3'-sulfophenylamino)-4-fluoro-6-(β-sulfoethylamino)-1,3,5-triazine | greenish blue |
| 318 | 2-(4'-Amino-2',5'-disulfophenylamino)-4-fluoro-6-(β-hydroxyethylamino-1,3,5-triazine | 2-(4'-Amino-3'-sulfophenylamino)-4-fluoro-6-(β-sulfoethylamino)-1,3,5-triazine | greenish blue |
| 319 | 2-(4'-Amino-2',5'-disulfophenylamino)-4-fluoro-6-(β-sulfoethylamino)-1,3,5-triazine | 2-(4'-Amino-3'-sulfophenylamino)-4-fluoro-6-(β-sulfoethylamino)-1,3,5-triazine | greenish blue |
| 320 | 2-(3'-Amino-4'-sulfophenylamino)-4-fluoro-6-(2"-sulfophenylamino)-1,3,5-triazine | 2-(4'-Amino-2',5'-disulfophenylamino)-4-fluoro-6-(2"-sulfophenylamino)-1,3,5-triazine | greenish blue |
| 321 | 2-(3'-Amino-4'-sulfophenylamino)-4-fluoro-6-(1"-sulfonaphth-2"-yl-amino)-1,3,5-triazine | 2-(4'-Amino-2',5'-disulfophenylamino)-4-fluoro-6-(2"-sulfophenylamino)-1,3,5-triazine | greenish blue |
| 322 | 2-(3'-Amino-4'-sulfophenylamino)-4-fluoro-6-(2"-chloro-5"-sulfophenylamino)-1,3,5-triazine | 2-(4'-Amino-2',5'-disulfophenylamino)-4-fluoro-6-(2"-sulfophenylamino)-1,3,5-triazine | greenish blue |
| 323 | 2-(3'-Amino-4'-sulfophenylamino)-4-fluoro-6-(β-hydroxyethylamino)-1,3,5-triazine | 2-(4'-Amino-2',5'-disulfophenylamino)-4-fluoro-6-(2"-sulfophenylamino)-1,3,5-triazine | greenish blue |
| 324 | 2-(3'-Amino-4'-sulfophenylamino)-4-fluoro-6-(β-sulfoethylamino)-1,3,5-triazine | 2-(4'-Amino-2',5'-disulfophenylamino)-4-fluoro-6-(2"-sulfophenylamino)-1,3,5-triazine | greenish blue |
| 325 | 2-(4'-Amino-3'-sulfophenylamino)-4-fluoro-6-(2"-sulfophenylamino)-1,3,5-triazine | 2-(4'-Amino-2',5'-disulfophenylamino)-4-fluoro-6-(2"-sulfophenylamino)-1,3,5-triazine | greenish blue |
| 326 | 2-(4'-Amino-3'-sulfophenylamino)-4-fluoro-6-(1"-sulfonaphth-2"-yl-amino)-1,3,5-triazine | 2-(4'-Amino-2',5'-disulfophenylamino)-4-fluoro-6-(2"-sulfophenylamino)-1,3,5-triazine | greenish blue |

TABLE 1-continued

| No. | Diazo component | Diazo component | Shade on cotton |
|-----|----------------|-----------------|-----------------|
| 327 | 2-(4'-Amino-3'-sulfophenylamino)-4-fluoro-6-(2''-chloro-5''-sulfophenylamino)-1,3,5-triazine | 2-(4'-Amino-2',5'-disulfophenylamino)-4-fluoro-6-(2''-sulfophenylamino)-1,3,5-triazine | greenish blue |
| 328 | 2-(4'-Amino-3'-sulfophenylamino)-4-fluoro-6-($\beta$-hydroxyethylamino)-1,3,5-triazine | 2-(4'-Amino-2',5'-disulfophenylamino)-4-fluoro-6-(2''-sulfophenylamino)-1,3,5-triazine | greenish blue |
| 329 | 2-(4'-Amino-3'-sulfophenylamino)-4-fluoro-6-($\beta$-sulfoethylamino)-1,3,5-triazine | 2-(4'-Amino-2',5'-disulfophenylamino)-4-fluoro-6-(2''-sulfophenylamino)-1,3,5-triazine | greenish blue |
| 330 | 2-(4'-Amino-2',5'-disulfophenylamino)-4-fluoro-6-(1''-sulfonaphth-2''-ylamino)-1,3,5-triazine | 2-(4'-Amino-2',5'-disulfophenylamino)-4-fluoro-6-(2''-sulfophenylamino)-1,3,5-triazine | greenish blue |
| 331 | 2-(4'-Amino-2',5'-disulfophenylamino)-4-fluoro-6-(2''-chloro-5''-sulfophenylamino)-1,3,5-triazine | 2-(4'-Amino-2',5'-disulfophenylamino)-4-fluoro-6-(2''-sulfophenylamino)-1,3,5-triazine | greenish blue |
| 332 | 2-(4'-Amino-2',5'-disulfophenylamino)-4-fluoro-6-($\beta$-hydroxyethylamino)-1,3,5-triazine | 2-(4'-Amino-2',5'-disulfophenylamino)-4-fluoro-6-(2''-sulfophenylamino)-1,3,5-triazine | greenish blue |
| 333 | 2-(4'-Amino-2',5'-disulfophenylamino)-4-fluoro-6-($\beta$-sulfoethylamino)-1,3,5-triazine | 2-(4'-Amino-2',5'-disulfophenylamino)-4-fluoro-6-(2''-sulfophenylamino)-1,3,5-triazine | greenish blue |
| 334 | 2-(3'-Amino-4'-sulfophenylamino)-4-fluoro-6-(2''-sulfophenylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 335 | 2-(3'-Amino-4'-sulfophenylamino)-4-fluoro-6-(1''-sulfonaphth-2''-ylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 336 | 2-(3'-Amino-4'-sulfophenylamino)-4-fluoro-6-(2''-chloro-5''-sulfophenylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 337 | 2-(3'-Amino-4'-sulfophenylamino)-4-fluoro-6-($\beta$-hydroxyethylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 338 | 2-(3'-Amino-4'-sulfophenylamino)-4-fluoro-6-($\beta$-sulfoethylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 339 | 2-(4'-Amino-3'-sulfophenylamino)-4-fluoro-6-(2''-sulfophenylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 340 | 2-(4'-Amino-3'-sulfophenylamino)-4-fluoro-6-(1''-sulfonaphth-2''-ylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 341 | 2-(4'-Amino-3'-sulfophenylamino)-4-fluoro-6-(2''-chloro-5''-sulfophenylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 342 | 2-(4'-Amino-3'-sulfophenylamino)-4-fluoro-6-($\beta$-hydroxyethylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 343 | 2-(4'-Amino-3'-sulfophenylamino)-4-fluoro-6-($\beta$-sulfoethylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 344 | 2-(4'-Amino-2',5'-disulfophenylamino)-4-fluoro-6-(2''-sulfophenylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 345 | 2-(4'-Amino-2',5'-disulfophenylamino)-4-fluoro-6-(2''-chloro-5''-sulfophenylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 346 | 2-(4'-Amino-2',5'-disulfophenylamino)-4-fluoro-6-($\beta$-hydroxyethylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 347 | 2-(4'-Amino-2',5'-disulfophenylamino)-4-fluoro-6-($\beta$-sulfoethylamino)-1,3,5-triazine | 2-(4'-Amino-2',5'-disulfophenylamino)-4-fluoro-6-(1''-sulfonaphth-2''-ylamino)-1,3,5-triazine | greenish blue |
| 348 | 2-(3'-Amino-4'-sulfophenylamino)-4-fluoro-6-(2''-sulfophenylamino)-1,3,5-triazine | 2-(4'-Amino-2',5'-disulfophenylamino)-4-fluoro-6-(2''-chloro-5''-sulfophenylamino)-1,3,5-triazine | greenish blue |
| 349 | 2-(3'-Amino-4'-sulfophenylamino)-4-fluoro-6-(1''-sulfonaphth-2''-ylamino)-1,3,5-triazine | 2-(4'-Amino-2',5'-disulfophenylamino)-4-fluoro-6-(2''-chloro-5''-sulfophenylamino)-1,3,5-triazine | greenish blue |
| 350 | 2-(3'-Amino-4'-sulfophenylamino)-4-fluoro-6-(2''-chloro-5''-sulfophenylamino)-1,3,5-triazine | 2-(4'-Amino-2',5'-disulfophenylamino)-4-fluoro-6-(2''-chloro-5''-sulfophenylamino)-1,3,5-triazine | greenish blue |
| 351 | 2-(3'-Amino-4'-sulfophenylamino)-4-fluoro-6-($\beta$-hydroxyethylamino)-1,3,5-triazine | 2-(4'-Amino-2',5'-disulfophenylamino)-4-fluoro-6-(2''-chloro-5''-sulfophenylamino)-1,3,5-triazine | greenish blue |
| 352 | 2-(3'-Amino-4'-sulfophenylamino)-4-fluoro-6-($\beta$-sulfoethylamino)-1,3,5-triazine | 2-(4'-Amino-2',5'-disulfophenylamino)-4-fluoro-6-(2''-chloro-5''-sulfophenylamino)-1,3,5-triazine | greenish blue |
| 353 | 2-(4'-Amino-3'-sulfophenylamino)-4-fluoro-6-(2''-sulfophenylamino)-1,3,5-triazine | 2-(4'-Amino-2',5'-disulfophenylamino)-4-fluoro-6-(2''-chloro-5''-sulfophenylamino)-1,3,5-triazine | greenish blue |

TABLE 1-continued

| No. | Diazo component | Diazo component | Shade on cotton |
|---|---|---|---|
| 354 | 2-(4'-Amino-3'-sulfophenylamino)-4-fluoro-6-(1''-sulfonaphth-2''-yl-amino)-1,3,5-triazine | 2-(4'-Amino-2',5'-disulfophenyl-amino)-4-fluoro-6-(2''-chloro-5''-sulfophenylamino)-1,3,5-triazine | greenish blue |
| 355 | 2-(4'-Amino-3'-sulfophenylamino)-4-fluoro-6-(2''-chloro-5''-sulfo-phenylamino)-1,3,5-triazine | 2-(4'-Amino-2',5'-disulfophenyl-amino)-4-fluoro-6-(2''-chloro-5''-sulfophenylamino)-1,3,5-triazine | greenish blue |
| 356 | 2-(4'-Amino-3'-sulfophenylamino)-4-fluoro-6-($\beta$-hydroxyethylamino)-1,3,5-triazine | 2-(4'-Amino-2',5'-disulfophenyl-amino)-4-fluoro-6-(2''-chloro-5''-sulfophenylamino)-1,3,5-triazine | greenish blue |
| 357 | 2-(4'-Amino-3'-sulfophenylamino)-4-fluoro-6-($\beta$-sulfoethylamino)-1,3,5-triazine | 2-(4'-Amino-2',5'-disulfophenyl-amino)-4-fluoro-6-(2''-chloro-5''-sulfophenylamino)-1,3,5-triazine | greenish blue |
| 358 | 2-(4'-Amino-2',5'-disulfophenyl-amino)-4-fluoro-6-(2''-sulfo-phenylamino)-1,3,5-triazine | 2-(4'-Amino-2',5'-disulfophenyl-amino)-4-fluoro-6-(2''-chloro-5''-sulfophenylamino)-1,3,5-triazine | greenish blue |
| 359 | 2-(4'-Amino-2',5'-disulfophenyl-amino)-4-fluoro-6-(1''-sulfonaphth-2''-ylamino)-1,3,5-triazine | 2-(4'-Amino-2',5'-disulfophenyl-amino)-4-fluoro-6-(2''-chloro-5''-sulfophenylamino)-1,3,5-triazine | greenish blue |
| 360 | 2-(4'-Amino-2',5'-disulfophenyl-amino)-4-fluoro-6-($\beta$-hydroxyethyl-amino)-1,3,5-triazine | 2-(4'-Amino-2',5'-disulfophenyl-amino)-4-fluoro-6-(2''-chloro-5''-sulfophenylamino)-1,3,5-triazine | greenish blue |
| 361 | 2-(4'-Amino-2',5'-disulfophenyl-amino)-4-fluoro-6-($\beta$-sulfoethyl-amino)-1,3,5-triazine | 2-(4'-Amino-2',5'-disulfophenyl-amino)-4-fluoro-6-(2''-chloro-5''-sulfophenylamino)-1,3,5-triazine | greenish blue |
| 362 | 2-(3'-Amino-4'-sulfophenylamino)-4-fluoro-6-(2''-sulfophenylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 363 | 2-(3'-Amino-4'-sulfophenylamino)-4-fluoro-6-(1''-sulfonaphth-2''-yl-amino)-1,3,5-triazine | 2-(4'-Amino-2',5'-disulfophenyl-amino)-4-fluoro-6-($\beta$-hydroxyethyl-amino)-1,3,5-triazine | greenish blue |
| 364 | 2-(3'-Amino-4'-sulfophenylamino)-4-fluoro-6-(2''-chloro-5''-sulfo-phenylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 365 | 2-(3'-Amino-4'-sulfophenylamino)-4-fluoro-6-($\beta$-hydroxyethylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 366 | 2-(3'-Amino-4'-sulfophenylamino)-4-fluoro-6-($\beta$-sulfoethylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 367 | 2-(4'-Amino-3'-sulfophenylamino)-4-fluoro-6-(2''-sulfophenylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 368 | 2-(4'-Amino-3'-sulfophenylamino)-4-fluoro-6-(1''-sulfonaphth-2''-ylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 369 | 2-(4'-Amino-3'-sulfophenylamino)-4-fluoro-6-(2''-chloro-5''-sulfo-phenylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 370 | 2-(4'-Amino-3'-sulfophenylamino)-4-fluoro-6-($\beta$-hydroxyethylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 371 | 2-(4'-Amino-3'-sulfophenylamino)-4-fluoro-6-($\beta$-sulfoethylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 372 | 2-(4'-Amino-2',5'-disulfophenyl-amino)-4-fluoro-6-(2''-sulfo-phenylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 373 | 2-(4'-Amino-2',5'-disulfophenyl-amino)-4-fluoro-6-(1''-sulfonaphth-2''-ylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 374 | 2-(4'-Amino-2',5'-disulfophenyl-amino)-4-fluoro-6-(2''-chloro-5''-sulfophenylamino)-1,3,5-triazine | 2-(4'-Amino-2',5'-disulfophenyl-amino)-4-fluoro-6-($\beta$-hydroxyethyl-amino)-1,3,5-triazine | greenish blue |
| 375 | 2-(4'-Amino-2',5'-disulfophenyl-amino)-4-fluoro-6-($\beta$-sulfoethyl-amino)-1,3,5-triazine | 2-(4'-Amino-2',5'-disulfophenyl-amino)-4-fluoro-6-($\beta$-hydroxyethyl-amino)-1,3,5-triazine | greenish blue |
| 376 | 2-(3'-Amino-4'-sulfophenylamino)-4-fluoro-6-(2''-sulfophenylamino)-1,3,5-triazine | 2-(4'-Amino-2',5'-disulfophenyl-amino)-4-fluoro-6-($\beta$-sulfoethyl-amino)-1,3,5-triazine | greenish blue |
| 377 | 2-(3'-Amino-4'-sulfophenylamino)-4-fluoro-6-(1''-sulfonaphth-2''-ylamino)-1,3,5-triazine | 2-(4'-Amino-2',5'-disulfophenyl-amino)-4-fluoro-6-($\beta$-sulfoethyl-amino)-1,3,5-triazine | greenish blue |
| 378 | 2-(3'-Amino-4'-sulfophenylamino)-4-fluoro-6-(2''-chloro-5''-sulfo-phenylamino)-1,3,5-triazine | 2-(4'-Amino-2',5'-disulfophenyl-amino)-4-fluoro-6-($\beta$-sulfoethyl-amino)-1,3,5-triazine | greenish blue |
| 379 | 2-(3'-Amino-4'-sulfophenylamino)-4-fluoro-6-($\beta$-hydroxyethylamino)-1,3,5-triazine | 2-(4'-Amino-2',5'-disulfophenyl-amino)-4-fluoro-6-($\beta$-sulfoethyl-amino)-1,3,5-triazine | greenish blue |
| 380 | 2-(3'-Amino-4'-sulfophenylamino)-4-fluoro-6-($\beta$-sulfoethylamino)-1,3,5-triazine | 2-(4'-Amino-2',5'-disulfophenyl-amino)-4-fluoro-6-($\beta$-sulfoethyl-amino)-1,3,5-triazine | greenish blue |

TABLE 1-continued

| No. | Diazo component | Diazo component | Shade on cotton |
|---|---|---|---|
| 381 | 2-(4'-Amino-3'-sulfophenylamino)-4-fluoro-6-(2''-sulfophenylamino)-1,3,5-triazine | 2-(4'-Amino-2',5'-disulfophenylamino)-4-fluoro-6-($\beta$-sulfoethylamino)-1,3,5-triazine | greenish blue |
| 382 | 2-(4'-Amino-3'-sulfophenylamino)-4-fluoro-6-(1''-sulfonaphth-2''-ylamino)-1,3,5-triazine | 2-(4'-Amino-2',5'-disulfophenylamino)-4-fluoro-6-($\beta$-sulfoethylamino)-1,3,5-triazine | greenish blue |
| 383 | 2-(4'-Amino-3'-sulfophenylamino)-4-fluoro-6-(2''-chloro-5''-sulfophenylamino)-1,3,5-triazine | 2-(4'-Amino-2',5'-disulfophenylamino)-4-fluoro-6-($\beta$-sulfoethylamino)-1,3,5-triazine | greenish blue |
| 384 | 2-(4'-Amino-3'-sulfophenylamino)-4-fluoro-6-($\beta$-hydroxyethylamino)-1,3,5-triazine | 2-(4'-Amino-2',5'-disulfophenylamino)-4-fluoro-6-($\beta$-sulfoethylamino)-1,3,5-triazine | greenish blue |
| 385 | 2-(4'-Amino-3'-sulfophenylamino)-4-fluoro-6-($\beta$-sulfoethylamino)-1,3,5-triazine | 2-(4'-Amino-2',5'-disulfophenylamino)-4-fluoro-6-($\beta$-sulfoethylamino)-1,3,5-triazine | greenish blue |
| 386 | 2-(4'-Amino-2',5'-disulfophenylamino)-4-fluoro-6-(2''-sulfophenylamino)-1,3,5-triazine | 2-(4'-Amino-2',5'-disulfophenylamino)-4-fluoro-6-($\beta$-sulfoethylamino)-1,3,5-triazine | greenish blue |
| 387 | 2-(4'-Amino-2',5'-disulfophenylamino)-4-fluoro-6-(1''-sulfonaphth-2''-ylamino)-1,3,5-triazine | 2-(4'-Amino-2',5'-disulfophenylamino)-4-fluoro-6-($\beta$-sulfoethylamino)-1,3,5-triazine | greenish blue |
| 388 | 2-(4'-Amino-2',5'-disulfophenylamino)-4-fluoro-6-(2''-chloro-5''-sulfophenylamino)-1,3,5-triazine | 2-(4'-Amino-2',5'-disulfophenylamino)-4-fluoro-6-($\beta$-sulfoethylamino)-1,3,5-triazine | greenish blue |
| 389 | 2-(4'-Amino-2',5'-disulfophenylamino)-4-fluoro-6-($\beta$-hydroxyethylamino)-1,3,5-triazine | 2-(4'-Amino-2',5'-disulfophenylamino)-4-fluoro-6-($\beta$-sulfoethylamino)-1,3,5-triazine | greenish blue |
| 390 | 2-(3'-Amino-4',6'-disulfophenylamino)-4-fluoro-6-($\beta$-hydroxyethylamino)-1,3,5-triazine | 2-(3'-Amino-4'-sulfophenylamino)-4-fluoro-6-(2''-sulfophenylamino)-1,3,5-triazine | blue |
| 391 | 2-(3'-Amino-4',6'-disulfophenylamino)-4-fluoro-6-($\beta$-hydroxyethylamino)-1,3,5-triazine | 2-(4'-Amino-3'-sulfophenylamino)-4-fluoro-6-(2''-sulfophenylamino)-1,3,5-triazine | greenish blue |
| 392 | 2-(3'-Amino-4',6'-disulfophenylamino)-4-fluoro-6-(N-methyl-N-phenylamino)-1,3,5-triazine | 2-(3'-Amino-4'-sulfophenylamino)-4-fluoro-6-amino-1,3,5-triazine | blue |
| 393 | 2-(3'-Amino-4',6'-disulfophenylamino)-4-fluoro-6-(N-methyl-N-phenylamino)-1,3,5-triazine | 2-(4'-Amino-3'-sulfophenylamino)-4-fluoro-6-amino-1,3,5-triazine | greenish blue |
| 394 | 2-(3'-Amino-4',6'-disulfophenylamino)-4-fluoro-6-(N-ethyl-N-phenylamino)-1,3,5-triazine | 2-(3'-Amino-4'-sulfophenylamino)-4-fluoro-6-amino-1,3,5-triazine | blue |
| 395 | 2-(3'-Amino-4',6'-disulfophenylamino)-4-fluoro-6-(N-ethyl-N-phenylamino)-1,3,5-triazine | 2-(4'-Amino-3'-sulfophenylamino)-4-fluoro-6-amino-1,3,5-triazine | greenish blue |
| 396 | 2-(3'-Amino-4',6'-disulfophenylamino)-4-fluoro-6-($\beta$-hydroxyethylamino)-1,3,5-triazine | 2-(3'-Amino-4'-sulfophenylamino)-4-fluoro-6-amino-1,3,5-triazine | blue |
| 397 | 2-(3'-Amino-4',6'-disulfophenylamino)-4-fluoro-6-($\beta$-hydroxyethylamino)-1,3,5-triazine | 2-(4'-Amino-3'-sulfophenylamino)-4-fluoro-6-amino-1,3,5-triazine | greenish blue |
| 398 | 2-(3'-Amino-4',6'-disulfophenylamino)-4-fluoro-6-(N-methyl-N-phenylamino)-1,3,5-triazine | 2-(3'-Amino-4'-sulfophenylamino)-4-fluoro-6-(2''-sulfophenylamino)-1,3,5-triazine | blue |
| 399 | 2-(3'-Amino-4',6'-disulfophenylamino)-4-fluoro-6-(N-methyl-N-phenylamino)-1,3,5-triazine | 2-(4'-Amino-3'-sulfophenylamino)-4-fluoro-6-(2''-sulfophenylamino)-1,3,5-triazine | greenish blue |
| 400 | 2-(3'-Amino-4',6'-disulfophenylamino)-4-fluoro-6-(N-ethyl-N-phenylamino)-1,3,5-triazine | 2-(3'-Amino-4'-sulfophenylamino)-4-fluoro-6-(2''-sulfophenylamino)-1,3,5-triazine | blue |
| 401 | 2-(3'-Amino-4',6'-disulfophenylamino)-4-fluoro-6-(N-ethyl-N-phenylamino)-1,3,5-triazine | 2-(4'-Amino-3'-sulfophenylamino)-4-fluoro-6-(2''-sulfophenylamino)-1,3,5-triazine | greenish blue |
| 402 | 2-(3'-Amino-4',6'-disulfophenylamino)-4-fluoro-6-(N,N-dimethylamino)-1,3,5-triazine | 2-(3'-Amino-4',6'-disulfophenylamino)-4-fluoro-6-(N,N-dimethylamino)-1,3,5-triazine | blue |
| 403 | 2-(3'-Amino-4',6'-disulfophenylamino)-4-fluoro-6-(N,N-diethylamino)-1,3,5-triazine | 2-(3'-Amino-4',6'-disulfophenylamino)-4-fluoro-6-(N,N-diethylamino)-1,3,5-triazine | blue |
| 404 | 2-(3'-Amino-4',6'-disulfophenylamino)-4-fluoro-6-(N,N-dimethylamino)-1,3,5-triazine | 2-(3'-Amino-4',6'-disulfophenylamino)-4-fluoro-6-(N,N-diethylamino)-1,3,5-triazine | blue |
| 405 | 2-(3'-Amino-4',6'-disulfophenylamino)-4-fluoro-6-(N,N-diethylamino)-1,3,5-triazine | 2-(3'-Amino-4',6'-disulfophenylamino)-4-fluoro-6-(N,N-dimethylamino)-1,3,5-triazine | blue |

Dyeing Method I 2 parts of a dye obtained as in Example 1 are dissolved in 400 parts of water; to this are added 1,500 parts of a solution which contains per liter 53 g of sodium chloride. 100 parts of a cotton fabric are introduced into this dyebath at 40° C. 45 minutes later, 100 parts of a solution which contains per liter 16 g of sodium hydroxide and 20 g of calcined sodium carbonate are added. The temperature of the dyebath is held at 40° C. for a further 45 minutes. The dyed fabric is then rinsed, soaped at the boil with a non-ionic detergent for a quarter of an hour, is rinsed once more and is dried.

Dyeing Method II 2 parts of a reactive dye obtained as in Example 1 are dissolved in 400 parts of water; to this are added 1,500 parts of a solution which contains per liter 53 g of sodium chloride. 100 parts of a cotton fabric are introduced into this dyebath at 35° C. 20 minutes later, 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped at the boil with a non-ionic detergent for a quarter of an hour, is rinsed once more and is dried.

Dyeing Method III 4 parts of a reactive dye obtained as in Example 1 are dissolved in 50 parts of water. To this are added 50 parts of a solution which contains per liter 5 g of sodium hydroxide and 20 g of calcined sodium carbonate. The resulting solution is used to pad-mangle a cotton fabric in such a way that its weight increases by 70%, and the fabric is then wound onto a beam. The cotton fabric is left in this state at room temperature for 3 hours. The dyed fabric is then rinsed, is soaped at the boil with a non-ionic detergent for a quarter of an hour, is rinsed once more and is dried.

Dyeing Method IV 6 parts of a reactive dye as obtained in Example 1 are dissolved in 50 parts of water. To this are added 50 parts of a solution which contains per liter 16 g of sodium hydroxide and 0.1 liter of 38° Be sodium silicate solution. The resulting solution is used to pad-mangle a cotton fabric in such a way that its weight increases by 70%, and the fabric is then wound to a beam. The cotton fabric is left in this state at room temperature for 10 hours. The dyed fabric is then rinsed, is soaped at the boil with a non-ionic detergent for a quarter of an hour, is rinsed once more and is dried.

Dyeing Method V 2 parts of a reactive dye as obtained in Example 1 are dissolved in 100 parts of water with the addition of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 grams of sodium hydroxide and 300 grams of sodium chloride, and is squeezed to a 75% weight increase, and the dyed fabric is steamed at 100° to 102° C. for 30 to 60 seconds, rinsed, soaped in an 0.3% boiling solution of a non-ionic detergent for a quarter of an hour, rinsed and dried.

Dyeing Method VI 4 parts of a reactive dye obtained as in Example 1 are dissolved in 50 parts of water with the addition of 1 part of sodium m-nitrobenzenesulfonate. To this are added 50 parts of a solution which contains per liter 120 g of sodium chloride, 40 g of calcined sodium carbonate and 100 g of urea. The resulting solution is used to pad-mangle a cotton fabric in such a way that its weight increases by 70%. The moist cotton fabric thus obtained is steamed at 102° C. in saturated steam for 90 seconds. The dyed fabric is then rinsed, soaped at the boil with a non-ionic detergent for a quarter of an hour, rinsed once more and dried.

Dyeing Method VII 6 parts of a reactive dye obtained as in Example 1 are dissolved in 50 parts of water with the addition of 1 part of sodium m-nitrobenzenesulfonate. To this are added 50 parts of a solution which contains per liter 20 g of calcined sodium carbonate and 400 g of urea. The resulting solution is used to pad-mangle a cotton fabric in such a way that its weight increases by 70%, and the fabric is then dried. The cotton fabric thus obtained is heat-set at 140° C. in the course of 90 seconds. The dyed fabric is then rinsed, soaped at the boil with a non-ionic detergent for quarter of an hour, rinsed once more and dried.

Dyeing Method VIII 4 parts of a reactive dye obtained as in Example 1 are dissolved in 50 parts of water with the addition of 1 part of sodium m-nitrobenzenesulfonate. To this are added 50 parts of a solution which contains per liter 11.2 g of sodium hydroxide, 0.04 liter of 38° Bé sodium silicate solution and 100 g of urea. The resulting solution is used to impregnate a cotton fabric in such a way that its weight increases by 70%, and the fabric is then dried. The cotton fabric thus obtained is steamed at 102° C. in saturated steam for 30 to 60 seconds. The dyed fabric is then rinsed, soaped at the boil with a non-ionic detergent for a quarter of an hour, rinsed once more and dried.

Printing method 3 parts of a reactive dye as obtained in Example 1 are sprinkled with high-speed stirring into 100 parts of a stock thickener containing 50 parts of 5% sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric, and the resulting printed fabric is dried and steamed at 102° C. in saturated steam for 2 to 8 minutes. The printed fabric is then rinsed, if desired soaped at the boil and rinsed once more, and then dried.

What is claimed is:

1. A reactive dye of the formula

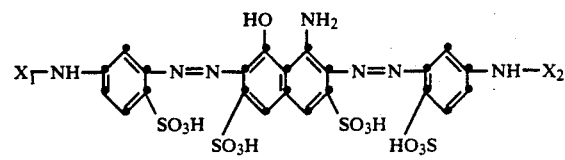

wherein $X_1$ and $X_2$, independently of each other, are each a radical of the formula

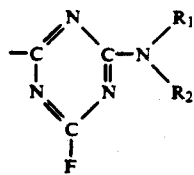

wherein —N(R₁)R₂ is phenylamino which is unsubstituted in the phenyl nucleus or is substituted therein by halogen, $C_1$–$C_4$-alkyl, $C_1$–$C_4$-alkoxy or sulfo.

2. A reactive dye according to claim 1 wherein —N(R₁)R₂ is phenylamino which is unsubstituted in the phenyl nucleus or is substituted therein by chlorine, methyl, ethyl, methoxy, ethoxy or sulfo.

* * * * *

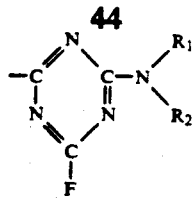

wherein —N(R₁)R₂ is phenylamino which is unsubstituted in the phenyl nucleus or is substituted therein by halogen, $C_1$–$C_4$-alkyl, $C_1$–$C_4$-alkoxy or sulfo.

2. A reactive dye according to claim 1 wherein —N(R₁)R₂ is phenylamino which is unsubstituted in the phenyl nucleus or is substituted therein by chlorine, methyl, ethyl, methoxy, ethoxy or sulfo.

* * * * *